(12) United States Patent
Satoyama et al.

(10) Patent No.: US 8,392,681 B2
(45) Date of Patent: *Mar. 5, 2013

(54) JOURNAL VOLUME BACKUP TO A STORAGE DEVICE

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,083

(22) Filed: Apr. 5, 2012

(65) Prior Publication Data

US 2012/0191932 A1    Jul. 26, 2012

Related U.S. Application Data

(63) Continuation of application No. 12/249,435, filed on Oct. 10, 2008, now Pat. No. 8,255,647.

(30) Foreign Application Priority Data

Aug. 27, 2008 (JP) .................................. 2008-218584

(51) Int. Cl.
*G06F 12/16* (2006.01)
(52) U.S. Cl. ................................ 711/162; 711/E12.103
(58) Field of Classification Search .................. 711/162, 711/E12.103
See application file for complete search history.

(56) References Cited

U.S. PATENT DOCUMENTS

| | | | |
|---|---|---|---|
| 6,847,984 B1 | 1/2005 | Midgley | |
| 7,558,926 B1 | 7/2009 | Oliveira et al. | |
| 2004/0268067 A1 | 12/2004 | Yamagami | |
| 2006/0123213 A1 | 6/2006 | Kasako | |
| 2006/0174076 A1 | 8/2006 | Takeda et al. | |
| 2006/0259722 A1 | 11/2006 | Watanabe | |
| 2007/0055704 A1 | 3/2007 | Watanabe et al. | |
| 2007/0067586 A1 | 3/2007 | Makami | |
| 2007/0174669 A1 | 7/2007 | Ebata et al. | |
| 2007/0183224 A1 | 8/2007 | Erofeev | |
| 2007/0220221 A1 | 9/2007 | Yamagami | |
| 2007/0271428 A1 | 11/2007 | Atluri | |
| 2007/0277012 A1 | 11/2007 | Hara et al. | |
| 2008/0010424 A1 | 1/2008 | Morita | |
| 2008/0059734 A1 | 3/2008 | Mizuno | |
| 2010/0058011 A1 | 3/2010 | Satoyama et al. | |

FOREIGN PATENT DOCUMENTS

| | | |
|---|---|---|
| JP | 2005 018738 | 1/2005 |
| JP | 2007 072519 | 3/2007 |
| JP | 2007 080131 | 3/2007 |
| JP | 2007 133471 | 5/2007 |
| JP | 2008 065503 | 3/2008 |

*Primary Examiner* — Hal Schnee
(74) *Attorney, Agent, or Firm* — Brundidge & Stanger, P.C.

(57) ABSTRACT

A computer system includes a first volume that is read and written from a first computer and in which write data is written, a second volume storing journal data in the first volume, the journal data delimited at each predetermined point, a third volume as a virtual volume, a unit that creates, when a backup instruction for the first volume at a predetermined point is received, the third volume from which a second computer reads the journal data and in which the second computer writes the journal data, a unit that maps the journal data to the third volume, and a unit that transfers the write data to a storage device via the second computer or transfers, through the third volume to which the journal data is mapped, the journal data to the storage device via the second computer and backs up the write data and the journal data.

19 Claims, 21 Drawing Sheets

FIG. 2

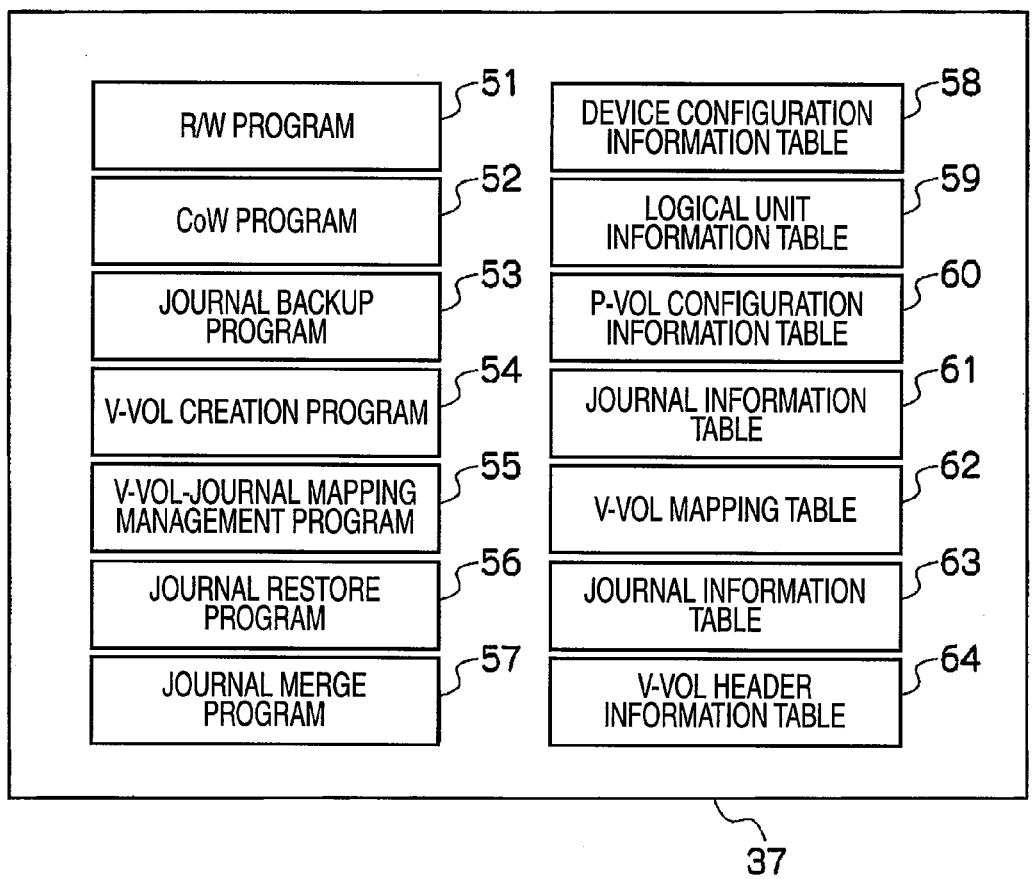

| 51 | R/W PROGRAM |
| 52 | CoW PROGRAM |
| 53 | JOURNAL BACKUP PROGRAM |
| 54 | V-VOL CREATION PROGRAM |
| 55 | V-VOL-JOURNAL MAPPING MANAGEMENT PROGRAM |
| 56 | JOURNAL RESTORE PROGRAM |
| 57 | JOURNAL MERGE PROGRAM |
| 58 | DEVICE CONFIGURATION INFORMATION TABLE |
| 59 | LOGICAL UNIT INFORMATION TABLE |
| 60 | P-VOL CONFIGURATION INFORMATION TABLE |
| 61 | JOURNAL INFORMATION TABLE |
| 62 | V-VOL MAPPING TABLE |
| 63 | JOURNAL INFORMATION TABLE |
| 64 | V-VOL HEADER INFORMATION TABLE |

FIG. 3

DEVICE CONFIGURATION INFORMATION TABLE 58

| DEVICE # | STATE | PRESENCE OR ABSENCE OF BUS | CONNECTION HOST INFORMATION | CAPACITY | ATTRIBUTE |
|---|---|---|---|---|---|
|  |  |  |  |  |  |
|  |  |  |  |  |  |

FIG. 4

| LOGICAL UNIT INFORMATION TABLE | | | 59 |
|---|---|---|---|
| PORT # | DEVICE # | LUN | |
| | | | |
| | | | |

JOURNAL INFORMATION TABLE

| P-VOL # | SNAPSHOT ACQUISITION TIME | BACKUP ACQUISITION TIME | 63 |
|---|---|---|---|
| | | | |
| | | | |

V-VOL HEADER INFORMATION TABLE

| HOST OPERATING SYSTEM | OS-DEPENDENT HEADER AREA INFORMATION | 64 |
|---|---|---|
| | | |
| | | |

FIG. 9

CATALOG MANAGEMENT INFORMATION 73

| P-VOL # | STORAGE SYSTEM NUMBER | GENERATION NUMBER IN STORAGE SYSTEM | GENERATION NUMBER IN TAPE DEVICE | BACKUP SERVER NUMBER | TAPE DEVICE NUMBER | BACKUP ACQUISITION TIME |
|---|---|---|---|---|---|---|
| | | | | | | |
| | | | | | | |

FIG. 10
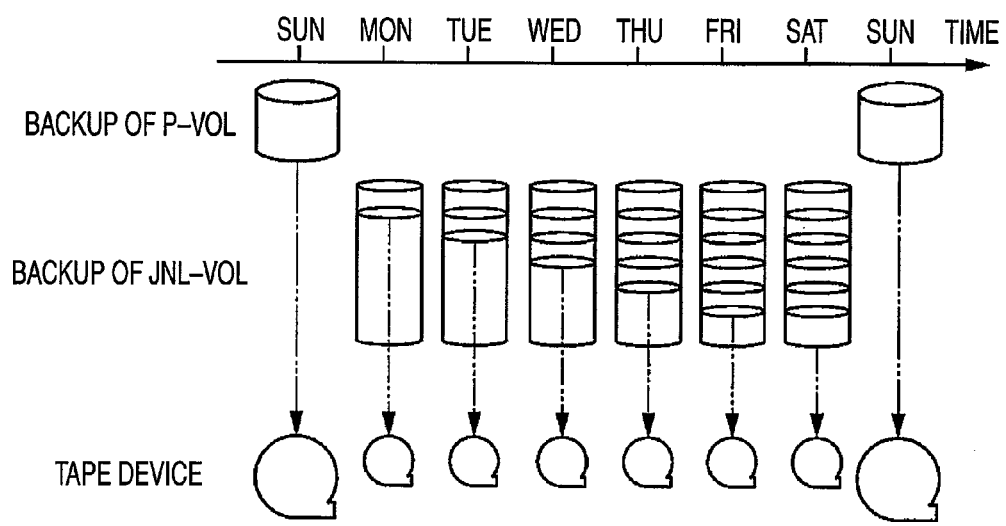
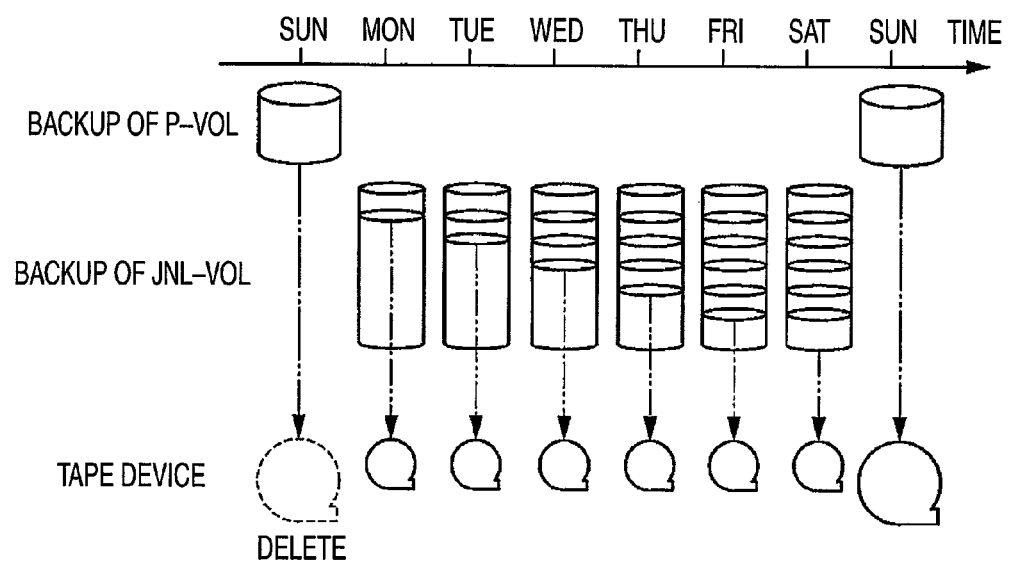

JOURNAL VOLUME BACKUP TO A STORAGE DEVICE

CROSS REFERENCES TO RELATED APPLICATIONS

The present application is a continuation of application Ser. No. 12/249,435, filed Oct. 10, 2008, now U.S. Pat. No. 8,255,647; which relates to and claims priority from Japanese Patent Application No. 2008-218584, field on Aug. 27, 2008, the entire disclosure of which is incorporated herein by reference.

BACKGROUND OF THE INVENTION

1. Field of the Invention

The present invention relates to a computer system and a backup method therefor and is suitably applied to, for example, a computer system that carries out backup of a volume that stores write data.

2. Description of the Related Art

Conventionally, for example, a snapshot function and a journal function are known as functions of a storage system.

The snapshot function is a function of storing an image of a logical volume at a certain point (e.g., a point when a snapshot acquisition request is received from a host computer). The storage system can intermittently acquire replication (backup) of data in the logical volume by periodically executing the snapshot function. When the snapshot function is used, the storage system can restore the logical volume at a point when a snapshot is acquired.

The journal function is a function of generating, in writing write data in a logical volume designated by a write command from the host computer, data (journal data) including the write data and control information concerning the writing of the write data and storing the generated journal data in a journal volume.

JP-A-2005-18738 discloses recovery processing executed, by writing journal data stored in a journal volume in a snapshot acquired by the snapshot function, at points other than a point when a snapshot is created. JP-A-2007-80131 discloses switching of a snapshot and a journal. JP-A-2007-133471 discloses operation of a restore volume for a snapshot.

SUMMARY OF THE INVENTION

In general, a backup server cannot recognize, as a target logical volume, a journal volume in which journal data is stored. The backup server can recognize only a normal logical volume and a replica volume of the logical volume. The journal volume in which the journal data is stored is data of an original format for accessing in a storage system. A tape device in the past usually stores data in file units or logical volume units.

As described above, the backup server cannot recognize the journal volume in which the journal data is stored. The journal volume cannot be stored in the tape device. Therefore, when a large amount of journal data is secured, it is likely that a capacity of a physical storage device in the storage system becomes insufficient.

The present invention has been devised in view of the points described above and it is an object of the present invention to provide a computer system and a backup method therefor that can markedly improve operation efficiency for a physical storage device.

In order to solve such a problem, the present invention provides a computer system including a first computer, a second computer, a storage device, and a storage system. The storage system includes a first volume that is read and written from the first computer and in which write data is written, a second volume that stores journal data in the first volume with the journal data delimited at each predetermined point, a third volume as a virtual volume, a virtual-volume creating unit that creates, when a backup instruction for the first volume at a predetermined point transmitted from the first computer is received, the third volume from which the second computer can read the journal data and in which the second computer can write the journal data, a mapping unit that maps the journal data to the third volume created by the virtual-volume creating unit, and a backup unit that transfers the write data to the storage device via the second computer or transfers, through the third volume to which the journal data is mapped by the mapping unit, the journal data to the storage device via the second computer and backs up the write data and the journal data.

Further, the preset invention provides a computer system including a first computer, a second computer, a storage device, and a storage system. The storage system includes a first volume that is independently formed in the storage system and stores first data that cannot be read and written from the first computer and the second computer, a second volume as a virtual volume, a virtual-volume creating unit that creates the second volume from which the second computer can read the first data and in which the second computer can write the first data, a mapping unit that maps the first data to the second volume, and a backup unit that backs up the first data in the storage device via the second computer.

Moreover, the present invention provides a backup method for a computer system including a first computer, a second computer, a storage device, and a storage system. The storage system includes a first volume that is read and written from the first computer and in which write data is written, a second volume that stores journal data in the first volume with the journal data delimited at each predetermined point, and a third volume as a virtual volume. The backup method includes a first step of the storage system creating, when a backup instruction for the first volume at a predetermined point transmitted from the first computer is received, the third volume from which the second computer can read the journal data and in which the second computer can write the journal data, a second step of the storage system mapping the journal data to the third volume created in the first step, and a third step of the storage system transferring the write data to the storage device via the second computer or transferring, through the third volume to which the journal data is mapped in the second step, the journal data to the storage device via the second computer and backing up the write data and the journal data.

Therefore, even if the storage device has a configuration same as that in the past, the second computer can recognize the second volume in which the journal data is stored. The journal data can be written in the storage device via the second computer. Therefore, when a large amount of journal data is secured, it is possible to effectively prevent a capacity of a physical storage device in the storage system from becoming insufficient.

According to the present invention, it is possible to realize a computer system and a backup method therefor that can markedly improve operation efficiency for a physical storage device.

DESCRIPTION OF THE DRAWINGS

FIG. 2 is a diagram of programs of a storage system;

FIG. 3 is a diagram of a device configuration information table;

FIG. 4 is a diagram of a logical unit information table;

FIG. 9 is a diagram of catalog management information;

FIG. 10 is a diagram of an example of a backup schedule;

DETAILED DESCRIPTION OF THE INVENTION

An embodiment of the present invention is explained in detail with reference to the accompanying drawings. The present invention is not limited by the embodiment.

(1) Configuration of a Computer System

Figure 1:
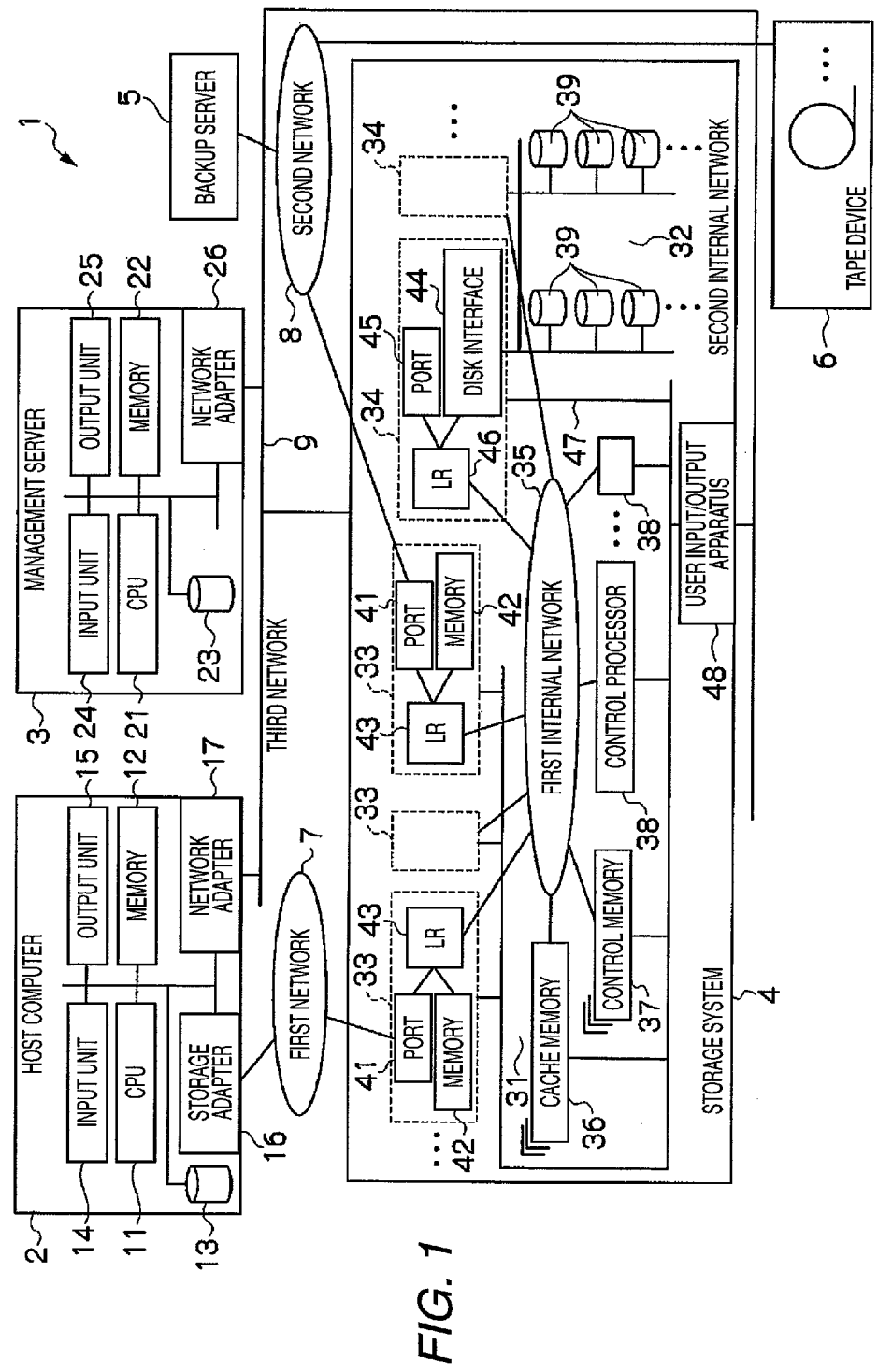
FIG. 1 is a diagram of a computer system according to the present invention.

FIG. 1 is a diagram of a configuration of a computer system 1 according to this embodiment. The computer system 1 is configured by connecting a host computer 2, a management server 3, a storage system 4, a backup server 5, and a tape device 6 via first to third networks 7 to 9.

One or more host computers 2 and one or more storage systems 4 are connected to the first network 7. One or more backup servers 5 and one or more tape devices 6 are connected to the second network 8. The tape device 6 may be any kind as long as the tape device 6 is a storage device including a VTL (Virtual Tape Library) and an inexpensive HDD (Hard Disk Drive) or a storage device such as a storage system at a remote copy destination placed on the outside of the storage system 4.

One or more host computers 2, one or more management servers 3, and one or more storage systems 4 are connected to the third network 9. Arbitrary kinds of networks can be adopted as the first to third networks 7 to 9, respectively. For example, the first network 7 and the second network 8 are SANs (Storage Area Networks) and the third network 9 is a LAN (Local Area Network).

The host computer 2 is a computer that accesses a logical volume provided by the storage system 4. The host computer 2 includes a CPU (Central Processing Unit) 11, a memory 12, an auxiliary storage device 13, an input unit (e.g., a keyboard and a pointing device) 14, an output unit (e.g., a display device) 15, a storage adapter (e.g., a host bus adapter) 16 connected to the first network 7, and a network adapter 17 connected to the third network 9.

The CPU 11 transmits an I/O command (a write command or a read command), which designates an address, via the storage adapter 16.

The management server 3 is a computer that manages the host computer 2, the storage system 4, the backup server 5, and the tape device 6 connected to the third network 9. The management server 3 includes a CPU (Central Processing Unit) 21, a memory 22, an auxiliary storage device 23, an input unit (e.g., a keyboard and a pointing device) 24, an output unit (e.g., a display device) 25, and a network adapter 26 connected to the third network 9.

The CPU 21 transmits predetermined commands to the host computer 2, the storage system 4, the backup server 5, and the tape device 6 via the network adapter 26. The memory 22 is a memory that stores computer programs and information shown in FIG. 8.

The storage system 4 has a controller 31 and a storage device group 32. The controller 31 includes, for example, plural front-end interfaces 33, plural back-end interfaces 34, a first internal network 35, one or more cache memories 36, one or more control memories 37, and one or more control processors 38. The storage device group 32 includes plural physical storage devices (hereinafter referred to as "PDEVs") 39.

The front-end interfaces 33 are interface circuits for communicating with the host computer 2, the backup server 5, and the tape device 6 on the outside of the storage system 4. Therefore, as the front-end interfaces 33, there are an interface connected to the first network 7 and an interface connected to the second network 8. Each of the front-end interfaces 33 includes, for example, a port 41 connected to the first network 7 or the second network 8, a memory 42, and a local router (hereinafter referred to as "LR") 43.

The port 41 and the memory 42 are connected to the LR 43. The LR 43 performs distribution for processing data received via the port 41 in an arbitrary control processor 38. Specifically, for example, the control processor 38 sets an I/O command for designating a certain address in the LR 43 to be carried out in the control processor 38. The LR 43 distributes the I/O command and the data according to the setting.

The back-end interfaces 34 are interface circuits for communicating with the PDEVs 39. Each of the back-end interfaces 34 includes, for example, a disk interface 44 connected to the PDEVs 39, a memory 45, and an LR 46. The disk interface 44 and the memory 45 are connected to the LR 46.

The first internal network 35 includes, for example, a switch (e.g., a cross-bus switch) or a bus. The plural front-end interfaces 33, the plural back-end interfaces 34, the one or more cache memories 36, the one or more control memories 37, and the one or more control processors 38 are connected to the first internal network 35. Communication among these components is performed via the first internal network 35.

The cache memories 36 are memories that temporarily store data read out from the host computer 2 or written in the host computer 2 according to an I/O command.

The control memories 37 are memories that store various computer programs and/or various kinds of information (e.g., computer programs and information shown in FIG. 2). For example, information indicating which P-VOL (a logical volume used on-line between the storage system 4 and the host computer 2) is a logical volume accessed from which host computer 2. The control processors 38 can specify, from this information, which P-VOL is a logical volume related to which host computer 2.

As described later, when the storage system 4 receives a host write size concerning a certain host computer 2, the control processors 38 can specify a P-VOL related to the host computer 2 referring to the information stored in the control memories 37 and set a host write size for a specified P-VOL 81. The control processors 38 perform processing described later by executing the various computer programs stored in the control memories 37.

The PDEVs 39 are nonvolatile storage devices and are, for example, hard disk drives or flash memory devices. A RAID group as a PDEV group conforming to the rules of RAID (Redundant Array of Independent Disks) is configured by two or more PDEVs 39. One or plural logical volumes (LUs: Logical Units) are set on the RAID group.

A second internal network (e.g., a LAN) 47 is connected to the front-end interfaces 33, the back-end interfaces 34, the cache memories 36, the control memories 37, and the control processors 38, which are the components of the controller 31. A user input/output apparatus 48 is connected to the second internal network 47.

The user input/output apparatus 48 is a computer that is also connected to the third network 9 and maintains or manages the storage system 4. A customer engineer can define various kinds of information stored in the control memories 37 by, for example, operating the user input/output apparatus 48 (or the management server 3 that can communicate with the user input/output apparatus 48).

The tape device 6 receives data from the backup server 5 and backs up the data or reads out data and transmits the data to the backup server 5.

In the following explanation, a logical volume may be abbreviated as "VOL" and the term "write" may be abbreviated as "WR".

FIG. 2 is a diagram of the computer programs and the information stored in the control memory 37. In the following explanation, processing described as being performed by a program is actually processing performed by the control processors 38 that execute the program.

An R/W program 51, a CoW (copy on Write) program 52, a journal (JNL) backup program 53, a V-VOL (described later) creation program 54, a V-VOL-journal mapping management program 55, a journal restore program 56, and a journal merge program 57 are stored in the control memory 37. A device configuration information table 58, a logical unit information table 59, a P-VOL configuration information table 60, a journal information table 61, a V-VOL mapping table 62, a journal information table 63, and a V-VOL header information table 64 are also stored in the control memory 37. The control memory 37 includes a system area (not shown).

The R/W program 51 controls I/O conforming to an I/O command from the host computer 2. The journal backup program 53 is a program for establishing an environment for backing up journal data in the tape device 6. The journal restore program 56 is a program for restoring the journal data, which is backed up in the tape device 6, as a logical volume of a designated generation in the storage system 4. The journal merge program 57 is a program for merging inter-generation differential data (described later) of plural generations. Details of the programs and the information stored in the control memory 37 are explained later.

FIG. 3 is a diagram of an example of the device configuration information table 58 shown in FIG. 2. The device configuration information table 58 is a table prepared for each of P-VOLs 81 (described later). A device #, a state, presence or absence of a path, connection host information, a capacity, and an attribute for each of the P-VOLs 81 are recorded in the device configuration information table 58.

The "device #" is a number for specifying a logical volume. The "state" is information on a state of the logical volume, for example, access restriction state such as R/W unavailable and only R available. The "presence or absence of a path" is information on whether an access path to a host computer is defined. The "connection host information" is information on a type of the host computer and is, for example, Windows (registered trademark), AIX, and a host write size. The "capacity" is information on a capacity of the logical volume. The "attribute" is information on whether the logical volume is a normal logical volume or a virtual volume.

FIG. 4 is a diagram of an example of the logical unit information table 59 shown in FIG. 2. The logical unit information table 59 is a table prepared in logical units (LUs) for input and output by the host computer 2. In the logical unit information table 59, a port #, a device #, and an LUN for each of the logical units are recorded.

The "port #" is a number of a port allocated to a target device corresponding to a logical volume. The "device #" is a number for specifying the PDEV 39. The "LUN" is a number of the logical unit (LUN: Logical Unit Number) and is an identifier for identifying the logical unit.

Figure 5:
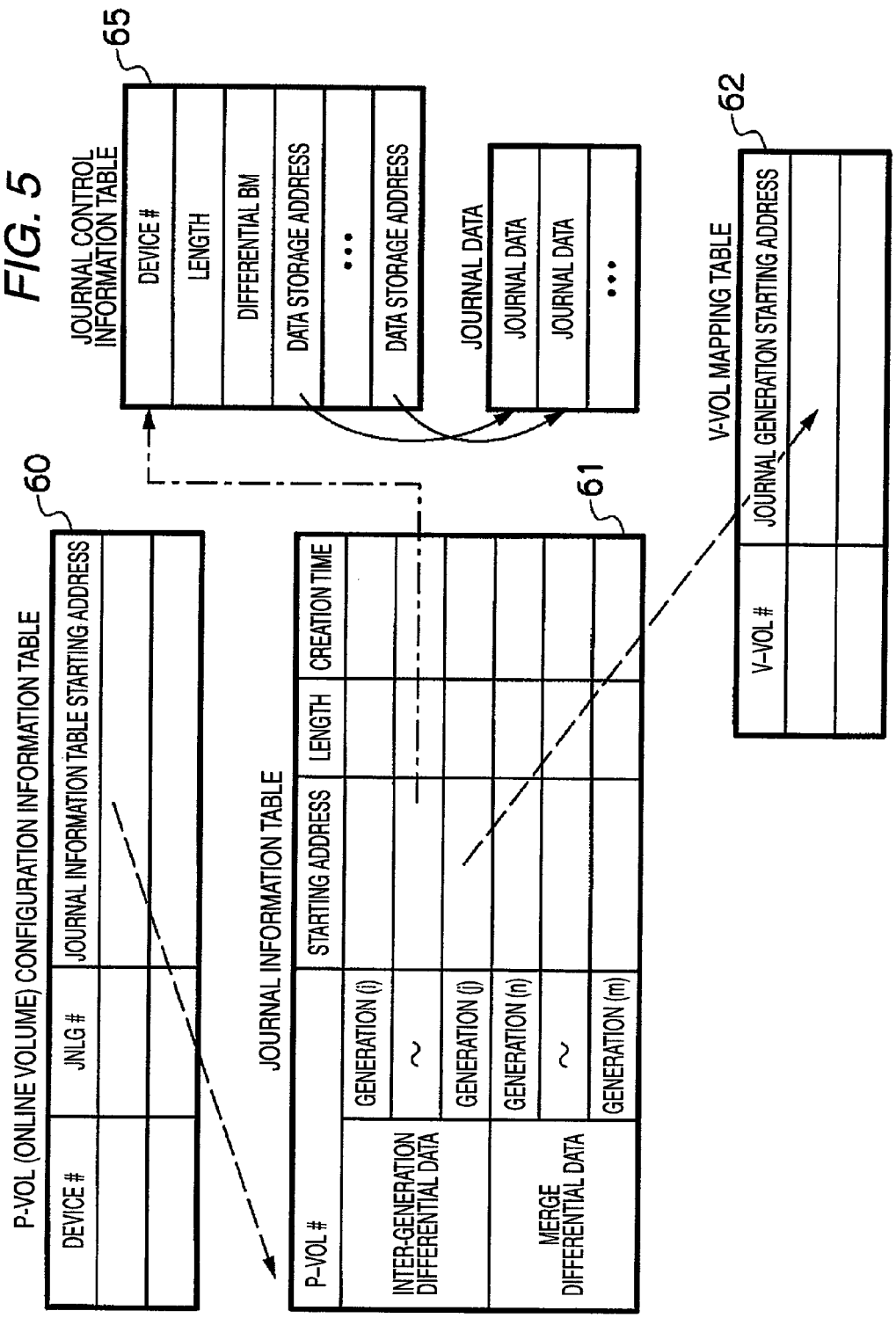
FIG. 5 is a diagram of a P-VOL configuration information table, a journal information table, a V-VOL mapping table, and a journal control information table.

FIG. 5 is a diagram of examples of the P-VOL configuration information table 60, the journal information table 61, and the V-VOL mapping table 62 shown in FIG. 2. In FIG. 5, a journal control information table 65 not shown in FIG. 2 and journal data managed in the journal control information table 65 are shown. The journal control information table 65 and the journal data are not stored in the control memory 37 but are stored in the storage device group 32 (in an example described later, a storage pool).

The P-VOL configuration information table 60 is a table prepared for a logical volume, an attribute of which is normal, in the device configuration information table 58. A device #, a JNLG #, and a journal information table starting address are recorded in the P-VOL configuration information table 60.

The "device #" is a number for specifying the PDEV 39. The "JNLG #" is a number of a journal group. Generations of journal data (or logical volumes) having the same JNLG are switched at the same timing. The "journal information table starting address" is a starting address of the journal information table 61.

The journal information table 61 is a table for managing inter-generation differential data prepared for each of P-VOLs and corresponding to the P-VOL. Concerning the inter-generation differential data, a starting address, length, and creation time are recorded for each of generations.

The "starting address" is a starting address of the journal control information table 65. The "length" is a data size and the number of elements of the generation in the inter-generation differential data. The "creation time" is time when a difference of the generation is stored (e.g., reception time of a marker that causes decision of a latest generation).

Similarly, concerning merge differential data (described later), a starting address, length, and creation time are recorded for each of generations.

The "generation" is a certain generation (e.g., a latest or oldest generation) among plural generations corresponding to the merge differential data. The "creation time" is time when merge differential data corresponding thereto is stored in a journal data storage area. The storage system 4 can refer to, by referring to the "starting address" corresponding to journal data, the journal control information 65 corresponding to the journal data.

The journal control information table 65 is present in each of the generations for each of the inter-generation differential data and the merge differential data. The journal control information table 65 is a table for managing a differential BM (Bitmap) corresponding to the generation and a location of a data element. Specifically, for example, a device #, length, a differential BM, and a data storage address are recorded in the journal control information table 65.

The "device #" is a number of a P-VOL corresponding thereto. The "length" is the length of journal data corresponding thereto (the inter-generation differential data or the merge differential data). The "differential BM" is a differential BM corresponding to the generation. The "data storage address" is an address corresponding to each of journal data elements forming the journal data.

The V-VOL mapping table 62 is a table for each of V-VOLs (backup volumes for P-VOLs) and is a table for managing, in order to backup journal data, information of which generation is mapped to the V-VOL. A V-VOL # and a journal generation starting address are recorded in the V-VOL mapping table. The "V-VOL #" is a number for specifying a V-VOL. The "journal generation starting address" is an address in which information of a generation as a backup target is stored.

Figures 6, 7, 8:
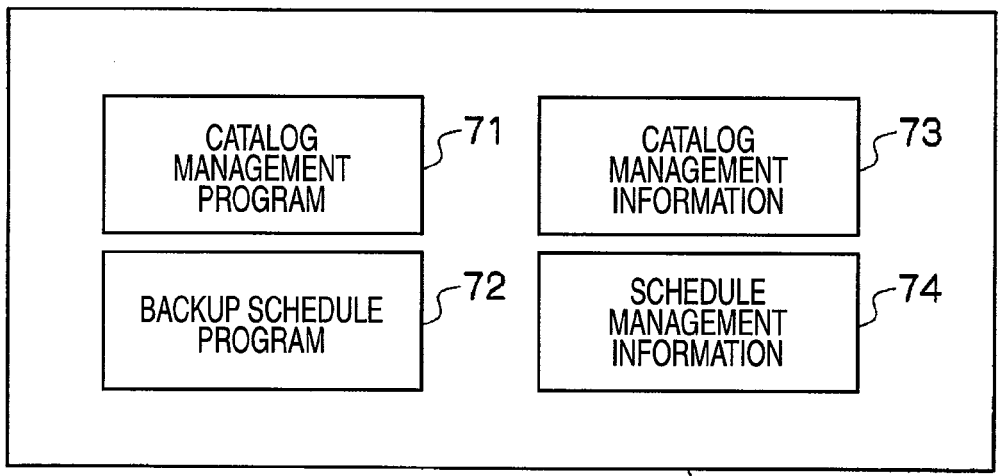
FIG. 6 is a diagram of a journal information table.
FIG. 7 is a diagram of a V-VOL header information table.
FIG. 8 is a diagram of programs of a management server.

FIG. 6 is a diagram of an example of the journal information table 63 shown in FIG. 2. The journal information table 63 is a table prepared for each of the P-VOLs and used for managing backup data concerning the P-VOL. For example, a P-VOL #, snapshot acquisition time, and backup acquisition time are recorded in the journal information table 63.

The "P-VOL #" is a number for specifying a P-VOL. The "snapshot acquisition time" is time when an S-VOL forming a pair with the P-VOL is created. The "backup acquisition time" is date and time when a backup is acquired (i.e., date and time of marker reception that causes decision of the generation).

Besides, although not shown in FIG. 6, the number of acquisition generations that is the number of generations of backups for the P-VOL, a backup period, the number of merge generations indicating how many generations of inter-generation differential data should be accumulated to execute merge processing, and the like are recorded.

FIG. 7 is a diagram of an example of the V-VOL header information table 64 shown in FIG. 2. The V-VOL header information table 64 is information on a logical volume created to read out journal data from the backup server 5 when journal data is backed up in the tape device 6.

A V-VOL is a virtual volume and has no entity. When an access to the V-VOL is necessary, the storage system 4 maps journal data corresponding to information registered in the V-VOL header information table 64 to the V-VOL and realizes the access to the V-VOL. In realizing the access, V-VOL header information is created and registered in the V-VOL header information table 64 in advance. The V-VOL header information for each of host operating systems (OSs) of the backup servers 5 are registered in the V-VOL header information table 64.

The host operating system and OS-dependent header area information are recorded in the V-VOL header information table 64. The "host operating system" is an identifier indicating a type of the operating system of the backup server 5. The "OS-dependent header area information" is V-VOL header information. The V-VOL header information may be stored in the control memory 37 or may be stored in the PDEV 39.

FIG. 8 is a diagram of the computer programs and the information stored in the memory 22 of the management server 3.

A catalog management program 71, a backup schedule program 72, catalog management information 73, and schedule management information 74 are stored in the memory 22.

The backup schedule program 72 registers a schedule of backup made up by a user in advance in the schedule management information 74 of the management server 3. The management server 3 transmits a backup instruction to the backup server 5 as scheduled. The catalog management information 73 is updated at an opportunity when the backup server 5 backs up data from the storage system 4 to the tape device 6 or restores the data from the tape device 6 to the storage system 4.

FIG. 9 is a diagram of an example of the catalog management information 73 shown in FIG. 8. The catalog management information 73 is information for managing which data is stored in which device. The catalog management information 73 manages a backup generation number stored in the tape device 6 and a generation number in the storage system 4.

Generation numbers are not always the same in the storage system 4 and the tape device 6. Therefore, in returning journal data from the tape device 6 to the storage system 4 and restoring a volume of a certain generation, the management server 3 restores the volume after matching the generation with the generation number in the storage system 4. In backing up data from the storage system 4 to the tape device 6, the management server 3 stores a target P-VOL # stored in the storage system 4.

The catalog management information 73 records from which backup server 5 to which tape device 6 data is stored. A P-VOL #, a storage system number, a generation number in a storage system, a generation number in a tape device, a backup server number, a tape device number, and backup acquisition time are recorded in the catalog management information 73.

The "P-VOL #" is a number for specifying a P-VOL that is an original logical volume to be backed up. The "storage system number" is an identifier such as a serial number of a device at a backup source. The "generation number in a storage system" is a generation number with which journal data as a backup target is managed in the storage system 4. The "generation number in a tape device" is a generation number in the tape device 6 of data as a backup target. The "backup server number" is an identifier such as a serial number of the backup server 5 that executes backup processing. The "tape device number" is an identifier such as a serial number of a device at a destination in which the journal data is backed up. The "backup acquisition time" is time when the backup processing is started.

FIG. 10 is a diagram of an example of a backup schedule. In this schedule, the tape device 6 acquires full-volume backup (backup of all data of the P-VOLs) every Sunday. Journal data, which is differential data from the previous day is backed up in the tape device 6 (journal data backup) in units of one day from Monday to Saturday. The storage system 4 monitors a journal amount in the storage system 4 and judges whether the journal data should be moved. When the journal data is moved, the storage system 4 schedules which journal data is moved and where the journal data is moved to. The host computer 2 transmits a "snapshot instruction (full-volume backup instruction)" when full-volume backup is executed. The host computer 2 transmits a "marker instruction (journal data backup instruction)" when journal data backup is executed. When the storage system 4 receives these instructions, the generation is switched.

In the schedule shown in FIG. 10, a snapshot is acquired on Sunday and the journal data is backed up in the tape device 6 by using the snapshot. In the schedule shown in FIG. 10, only journal data is backed up in the tape device 6 on the days other than Sunday. When journal data is acquired on Sunday separately from the snapshot acquired on Sunday and a new snapshot is acquired on the next Sunday, it is possible to delete the snapshot acquired last time.

(2) Overview of Storage of Journal Data

Figure 11:
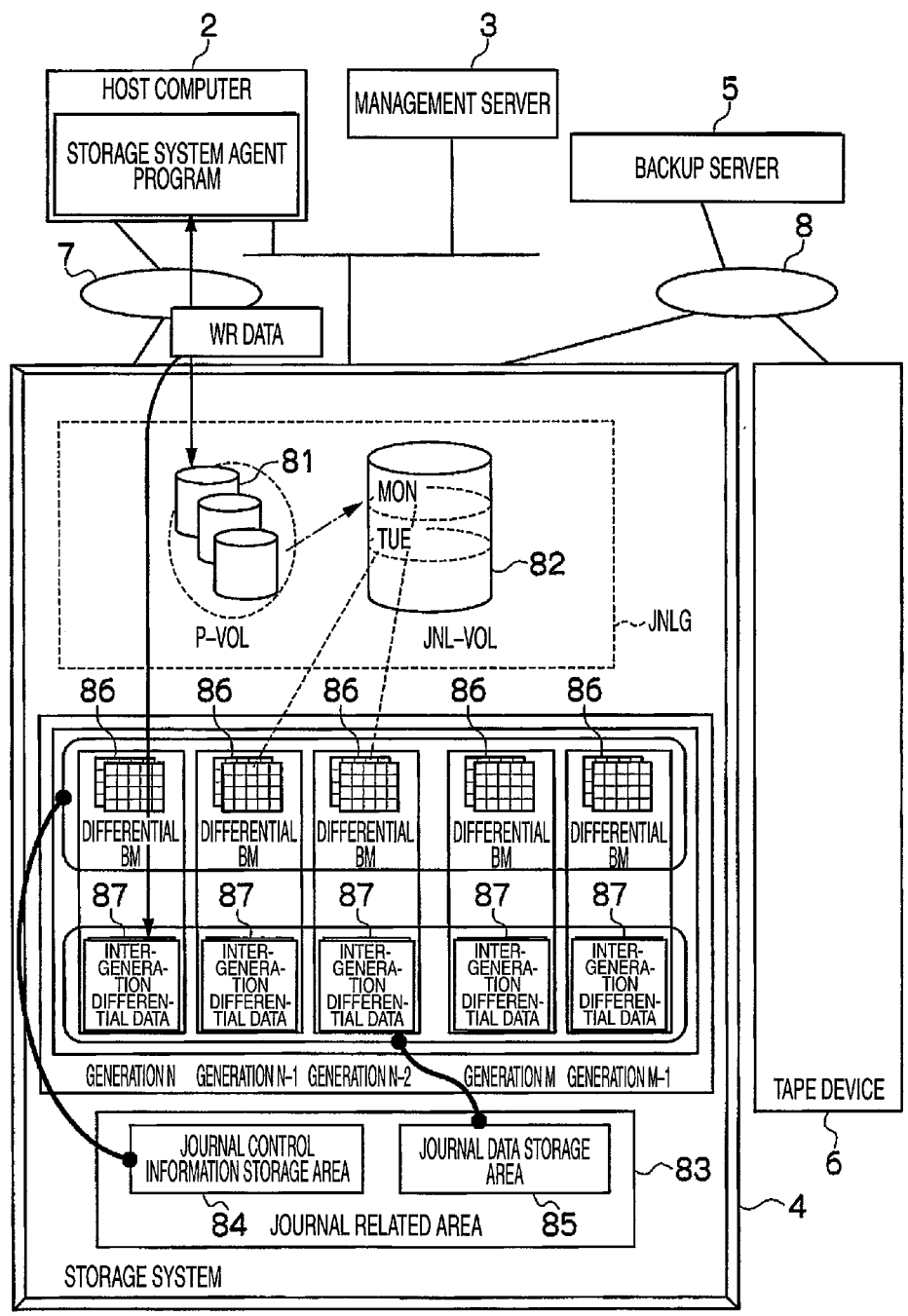
FIG. 11 is a schematic diagram of journal data storage of the computer system.

FIG. 11 is a diagram of an overview of storage of journal data. The storage system 4 has the P-VOLs 81 and a JNL-VOL 82.

The P-VOLs 81 are primary logical volumes (online logical volumes). The storage system 4 writes write data (WR data) transmitted from the host computer 2 in the P-VOLs 81 to update the P-VOLs 81. The JNL-VOL 82 is a logical volume in which a journal is written. The storage system 4 writes journal data in the JNL-VOL 82 to update the JNL-VOL 82.

A journal related area 83 is a storage area not provided to the host computer 2. The journal related area 83 is present in a storage pool (not shown). The storage pool includes plural pool areas. According to writing of journal data, an area is allocated to the journal data from the storage pool and the writing target data is written in the area.

The journal related area 83 includes a journal control information storage area 84 and a journal data storage area 85. As shown in FIG. 11, a differential BM (BM is an abbreviation of "Bitmap") 86 corresponding to each of decided generations is stored in the journal control information storage area 84. Inter-generation differential data 87 corresponding to each of the decided generations is stored in the journal data storage area 85.

The "generation" means a certain point concerning the P-VOLs 81. For example, a generation (N) means the time when a predetermined generation deciding event occurs concerning the P-VOLs 81 after a generation (N−1) passes (in this embodiment, the time when a journal data backup instruction is received from the host computer 2). In an example shown in FIG. 11, since a decided latest generation is the generation (N), an undecided generation is a generation (N+1). When a journal data backup instruction is received, the generation (N) is switched to the new generation (N+1). When the generation is switched, the storage system 4 adds an entry for the generation of the inter-generation differential data 87 in the journal information table 61.

The "differential BM" is a bitmap representing a difference between generations of a logical volume. Specifically, for example, in the example shown in FIG. 11, the differential BM 86 corresponding to the generation (N) is a bitmap representing a difference between the P-VOL 81 of the generation (N) and the P-VOL 81 of the generation (N−1). When a write data element is written in a block in the P-VOLs 81 for the first time at a point after the generation (N−1), the storage system 4 sets a bit corresponding to the block (a bit in the differential BM 86 corresponding to the generation (N)) ON (i.e., updates the bit to a value representing occurrence of write (e.g., "1")) and stores a differential data element corresponding to the write data element in the journal data storage area 85. Respective bits forming the differentia BMs 86 correspond to respective blocks of the P-VOLs 81. The "host write size" is a unit size of data (seize of a write data element) written from the host computer 2. In this example, the respective generations correspond to, for example, "journal on Monday" and "journal on Tuesday".

The "inter-generation differential data" is a set of inter-generation differential data elements. The "inter-generation differential data element" is a data element saved from the P-VOLs 81 because the data element is written in the P-VOLs 81. Specifically, for example, when an undecided generation is the generation (N), the generation (N) is decided and the undecided generation is changed to (N+1) when the storage system 4 receives a marker instruction (specific electronic data) from the host computer 2. In that case, the inter-generation differential data 87 (i.e., data corresponding to a difference between the P-VOL 81 of the generation (N) and the P-VOL 81 of the generation (N−1)) accumulated in the journal data storage area 85 is changed to an immediately preceding generation. The storage system 4 saves the inter-generation differential data 87 in the journal data storage area 85 as an inter-generation differential data element.

In this way, the storage system 4 accumulates the inter-generation differential data 87 corresponding to the generation (N−1) (i.e., data corresponding to a difference between the generation (N−1) and a generation (N−2)) in the journal data storage area 85.

(3) Journal Data Acquiring Method

There are two methods of acquiring journal data. A method of usually updating data in the P-VOLs 81 and storing the updated data in the JNL-VOL 82 as journal data when a marker instruction is received (FIG. 12) and a method of storing the data before update in the JNL-VOL 82 as journal data (FIG. 13) are explained.

Figure 12:
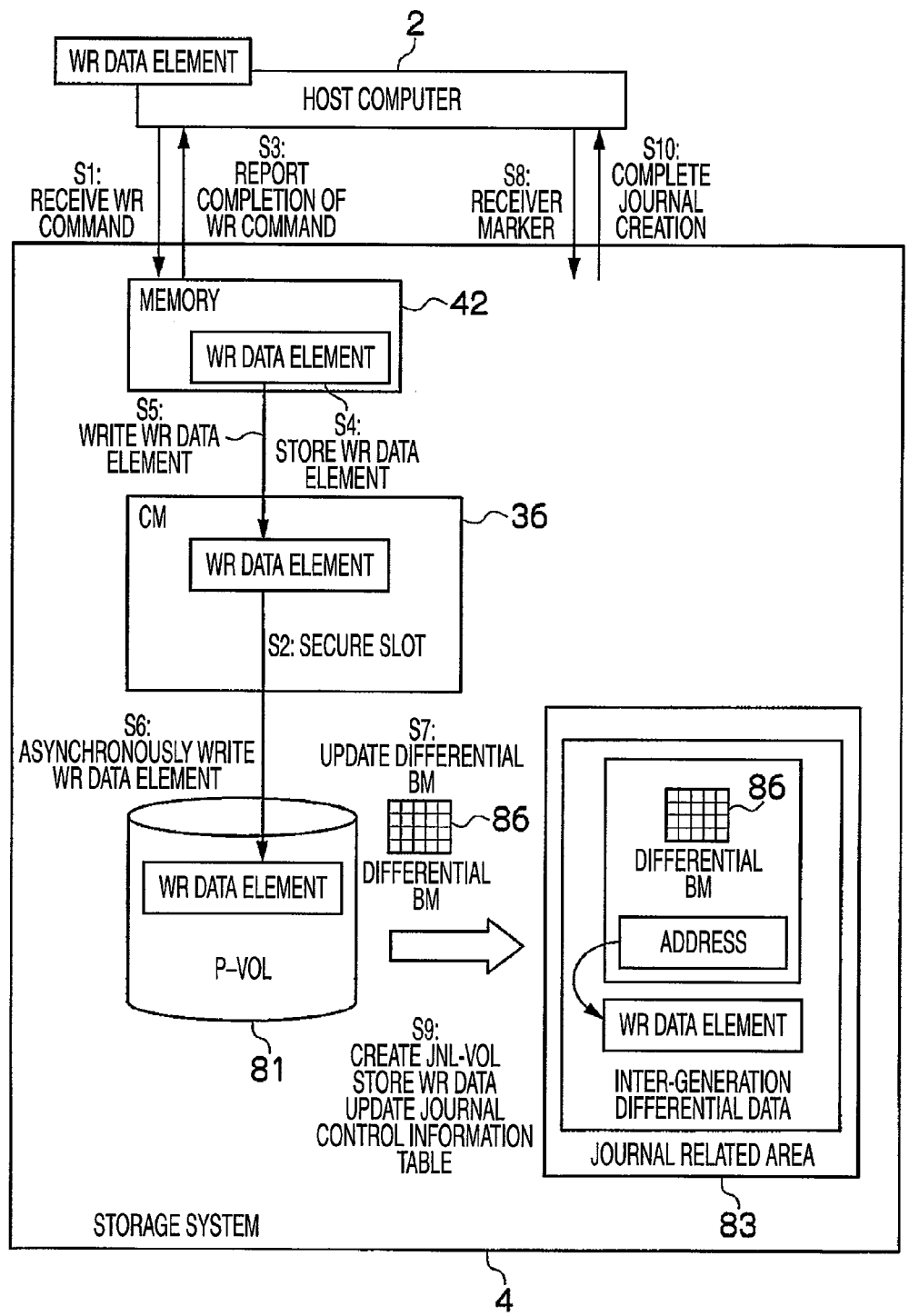
FIG. 12 is a flowchart of journal acquisition processing.

FIG. 12 is a diagram of an overview of write processing (After JNL) for writing a write data element in the P-VOLs 81. In the explanation of FIG. 12, the P-VOL 81 designated by a write command is referred to as "target P-VOL 81". In the following explanation, to prevent redundancy in explanation, a target corresponding to a generation "K" may be represented with (K) attached to the end of a name of the target. Specifically, for example, journal control information corresponding to a generation (j) may be represented as "journal control information (j)".

First, the front-end interface 33 receives a write command from the host computer 2 (S1) and transfers the write command to the control processors 38. Subsequently, the R/W program 51 (see FIG. 2) secures a slot from the cache memory 36 in response to the reception of the write command (S2). The "slot" is a unit management area of the cache memory 36. A size of the slot is, for example, larger than a host write size.

Subsequently, the R/W program 51 reports the completion of the write command to the host computer 2 at a transmission source of the write command (S3). When a write data element is transmitted from the host computer 2 in response to the report, the R/W program 51 stores the write data element in the memory 42 in the front-end interface 33 (S4).

The R/W program 51 writes the write data element stored in the memory 42 of the front-end interface 33 in the slot of the cache memory 36 (S5). The R/W program 51 asynchronously writes the write data element, which is written in the slot of the cache memory 36, in a write destination block in the target P-VOL 81 (S6). The R/W program 51 changes a bit corresponding to an updated location among bits of the differential BM 86 of the target P-VOL 81 to ON (S7) and writes the updated differential BM 86 into the journal related area 83.

On the other hand, the host computer 2 transmits a marker instruction to the target P-VOL 81 at different timing. The R/W program 51 receives the marker instruction (S8), creates the JNL-VOL 82, and updates the journal control information table 65 (S9).

The R/W program 51 copies write data (journal data) in a section of the target P-VOL 81 where a differential bit is ON to the journal data storage area 85 which forms a part of the journal related area 83 as illustrated in FIG. 11. In copying the write data, before copying the write data to the journal data storage area 85, the R/W program 51 secures an area from the journal data storage area 85 and manages an address of the area. When the creation of the JNL-VOL 82 is completed, the R/W program 51 transmits a report on completion of creation of the JNL-VOL 82 to the host computer 2 (S10).

When the host write size is not set yet, the R/W program 51 creates, for example, a write data element in a size of the slot as an initial value.

Figure 13:
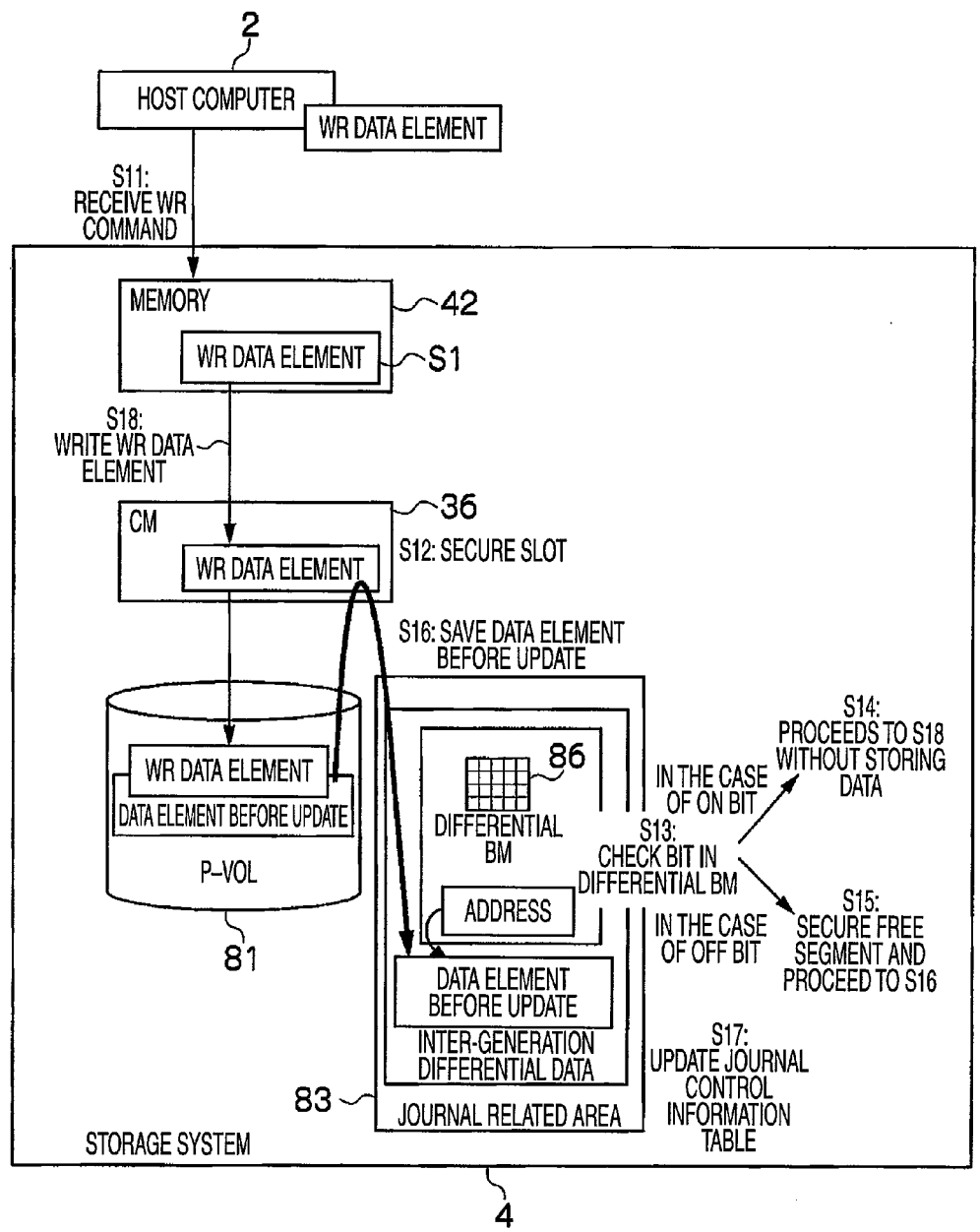
FIG. 13 is a flowchart of the journal acquisition processing.

FIG. 13 is a diagram of an overview of write processing (Before JNL) for writing a write data element in the target P-VOL 81 in this embodiment.

First, the R/W program 51 receives a write command from the host computer 2 (S11) and secures a slot for storing a write data element in the cache memory 36 (S12). The R/W program 51 refers to a bit corresponding to a write destination block designated by the write command in the differential BM 86 corresponding to a data element before update (write data presently stored in the P-VOL 81) (S13).

When a reference destination is an ON bit as a result of S13, the R/W program 51 executes S18 and subsequent steps without writing the data element before update in the JNL-VOL 82 (S14). The R/W program 51 does not save a data element stored in the write destination block in the JNL-VOL 82 as the data element before update.

On the other hand, when the reference destination is an OFF bit as a result of S13, the R/W program 51 specifies, referring to the journal control information table 65 corresponding to the target P-VOL (a P-VOL designated by the write command) 81, a free segment in the journal related area 83 corresponding to the data element before update for the target P-VOL 81 (S15). If there is no free segment in the journal data storage area 85, the R/W program 51 can secure the journal data storage area 85 anew.

After S15, the R/W program 51 saves the data element before update, which is stored in the write destination block, in the specified free segment (S16). The R/W program 51 updates the journal control information table 65 corresponding to online update differential data (S17). Specifically, the R/W program 51 changes the bit corresponding to the write destination block (the OFF bit at the reference destination in the differential BM) to ON and adds an address representing the free segment as a data storage address corresponding to the write destination block.

Thereafter, the R/W program 51 writes the write data element, which is stored in the memory 42 in the front-end interface 33, in the slot of the cache memory 36 secured in S12 (S18).

The R/W program 51 writes the write data element, which is written in the slot, in the write destination block in the target P-VOL 81 (S19). In the following explanation, a method of storing data before update as journal data is mainly explained. A method of storing updated data as journal data can be processed in the same manner.

(4) Backup Processing

Figure 14:
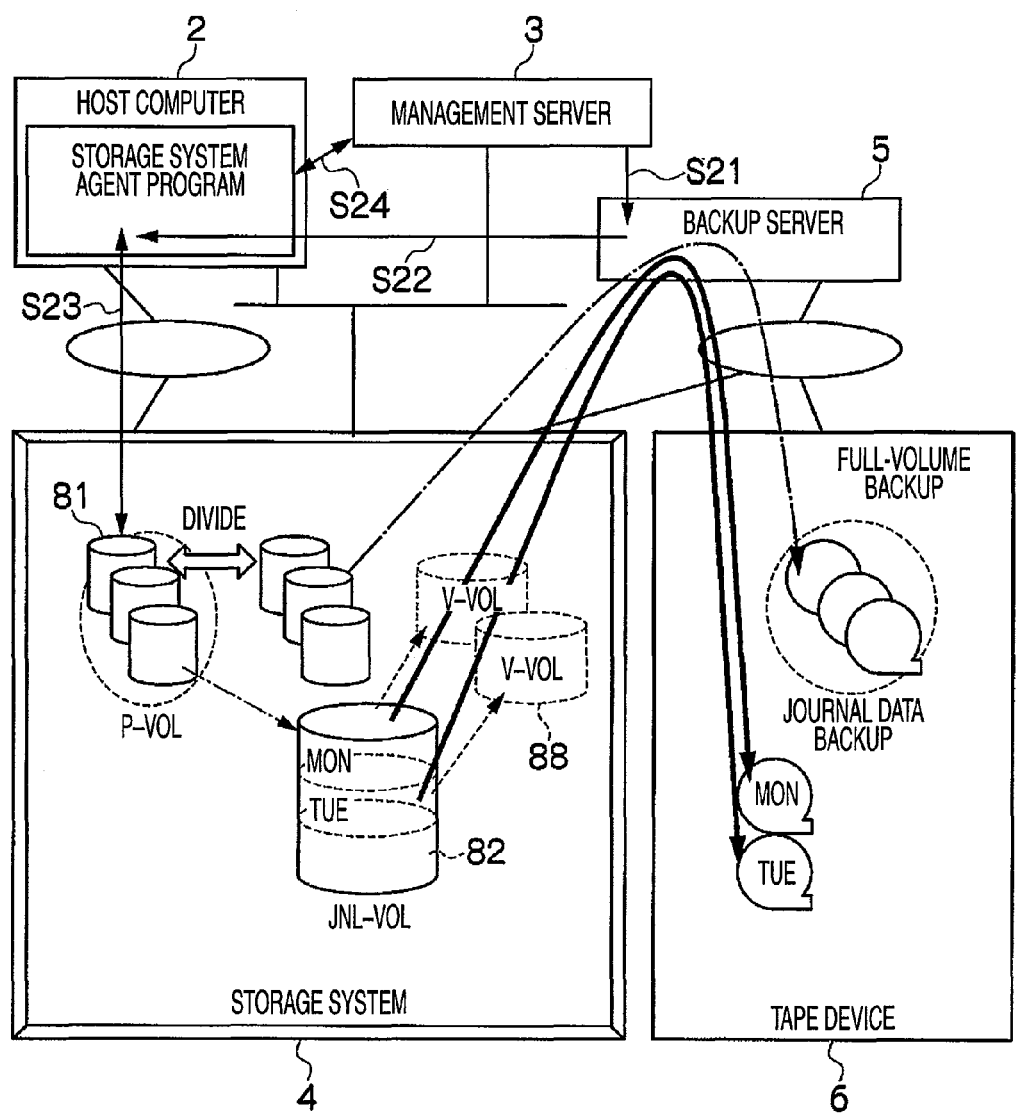
FIG. 14 is a schematic diagram of backup processing.

FIG. 14 is a diagram of an overview of the backup processing.

First, the management server 3 transmits a backup instruction to the backup server 5 (S21). Subsequently, the backup server 5 transmits a backup request to the host computer 2 (S22). The host computer 2 stops an application (not shown) and transmits the backup instruction to the storage system 4 (S23). The host computer 2 transmits a snapshot instruction in the case of full-volume backup and transmits a marker instruction in the case of journal data backup.

Subsequently, the management server 3 recognizes where the P-VOL 81 used by the application of the host computer 2 is present (S24). The storage system 4 receives a full-volume backup instruction from the host computer 2, divides the P-VOL 81 as a backup target, creates a snapshot, and separates a backup generation as illustrated in FIG. 14 by the divide arrow between the P-VOL 81 and divided volumes, the arrow extending from the P-VOL 81 to the JNL-VOL 82 and the arrow extending from the divided volumes to tape device 6. The storage system 4 receives a journal data backup instruction, creates V-VOLs 88 in a format that the tape device 6 can recognize, allocates journal data to the V-VOLs 88 for each of the generations, and performs backup of the journal data as illustrated in FIG. 14 by the arrows extending from the JNL VOL 82 to the V-VOLs 88 and the arrows extending from the JNL-VOL 82 through the V-VOLs 88 to the tape device 6.

Figure 15:
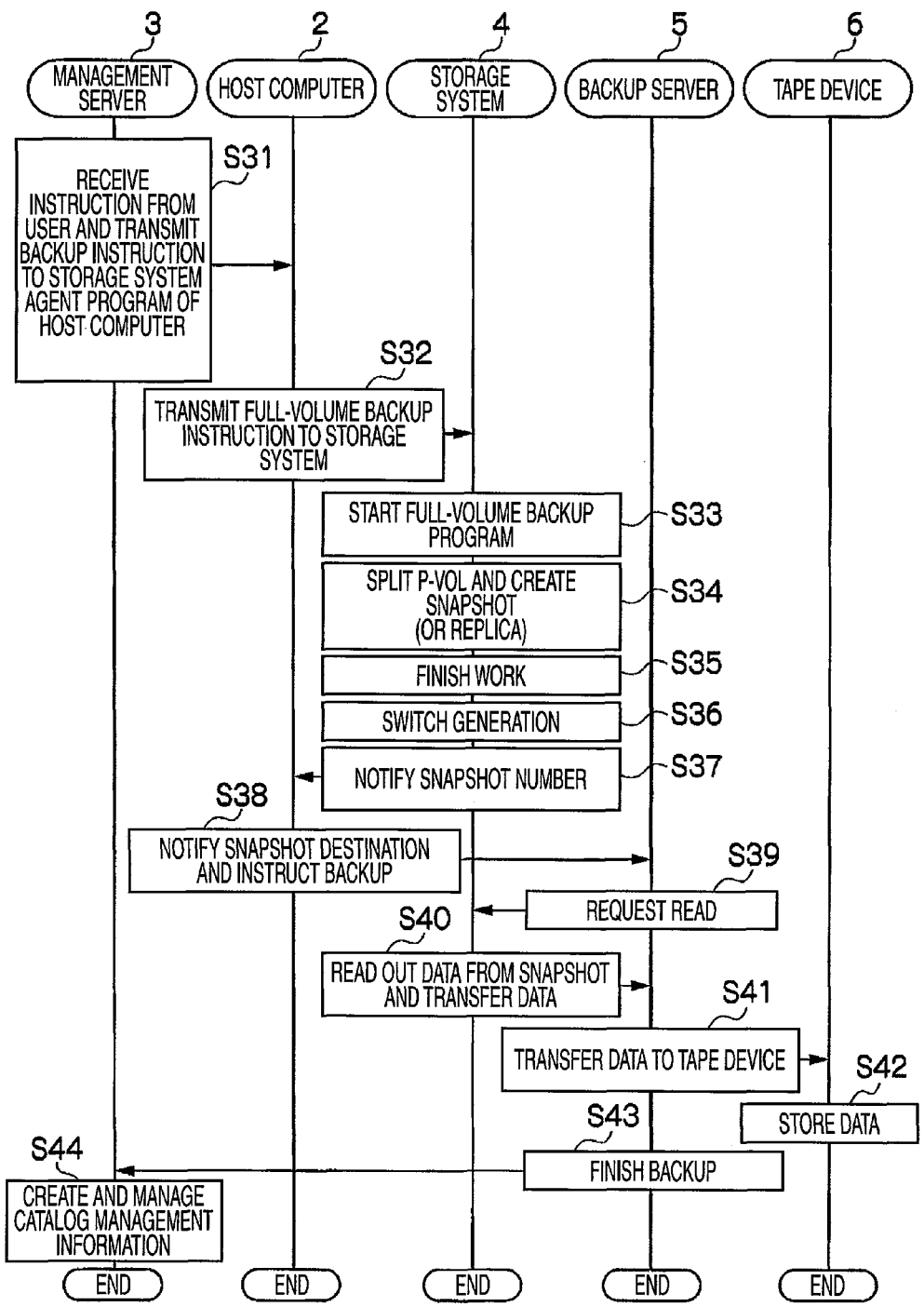
FIG. 15 is a flowchart of full-volume backup processing.

FIG. 15 is a diagram of a flowchart of the full-volume backup processing.

First, when a backup instruction from the user and a generation number to be backed up or time of a logical volume to be backed up are inputted, the management server 3 transmits the backup instruction to a storage system agent program of the host computer 2 (S31).

Subsequently, the host computer 2 transmits a full-volume backup instruction to the storage system 4 (S32). The storage system 4 starts a full-volume backup program (not shown) (S33). The storage system 4 splits a logical volume (the P-VOL 81) as a backup target and creates a snapshot (or a replica) (S34). In acquiring the snapshot, the storage system 4 may acquire the snapshot using the V-VOL 88 as a virtual volume or may acquire the snapshot using another virtual volume different from the V-VOL 88.

At a point when the snapshot creation is finished (S35), the generation is switched and the storage system 4 updates the journal information table 61 (S36). The storage system 4 notifies the host computer 2 of a logical volume number of the acquired snapshot that the host computer 2 can recognize (S37). The host computer 2 notifies the backup server 5 of the received logical volume number at the snapshot destination and transmits a backup instruction (S38).

The backup server 5 issues a read request for a snapshot volume corresponding to the received logical volume number of the snapshot to the storage system 4 (S39). The storage system 4 reads out data from the snapshot volume and transfers the data to the backup server 5 (S40). The backup server 5 transfers the data read from the storage system 4 to the tape device 6 (S41). The tape device 6 stores the received data (S42).

The backup server 5 reports the end of the backup to the management server 3 at a point when the data transfer to the tape device 6 is finished (S43). The management server 3 creates the catalog management information 73 concerning the carried-out backup and manages the catalog management information 73 (S44).

Figure 16:
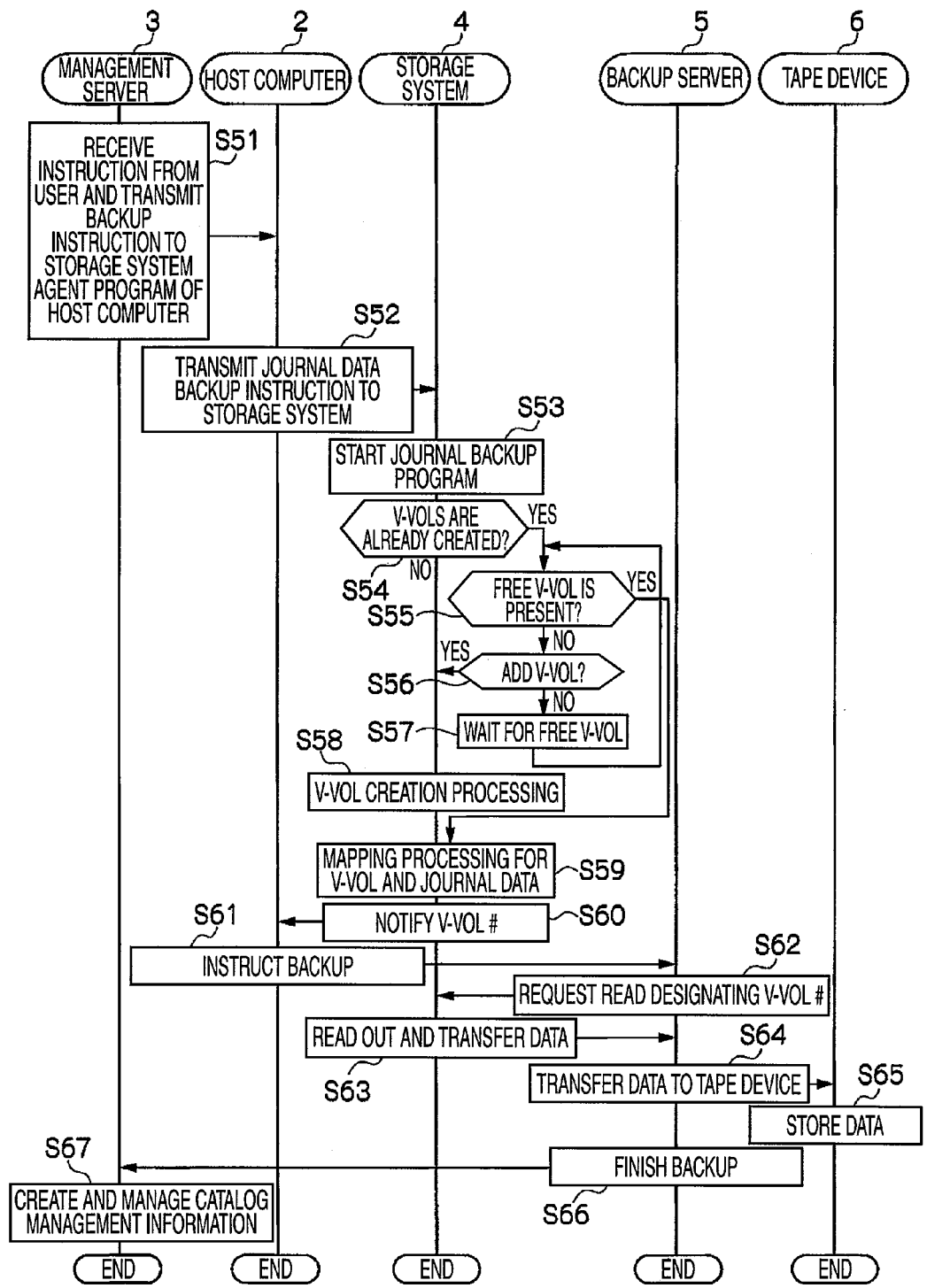
FIG. 16 is a flowchart of journal data backup processing.

FIG. 16 is a flowchart of the journal data backup processing.

First, when a backup instruction from the user and a generation number to be backed up or time of a logical volume to be backed up are inputted, the management server 3 transmits the backup instruction to the storage system agent program of the host computer 2 (S51). The backup schedule program 72 of the management server 3 may judge that journal data is moved, determine which journal data (data of which generation) is moved and where the journal data is moved to, and transmit an instruction.

Subsequently, the host computer 2 transmits a journal data backup instruction to the storage system 4 (S52). The storage system 4 starts the journal backup program 53 (S53). The storage system 4 searches whether the V-VOLs 88 for backing up a journal are already created in the system (S54). When the V-VOLs 88 are already created (S54: YES), the storage system 4 proceeds to S55. On the other hand, when the V-VOLs 88 are not created (S54: NO), the storage system 4 proceeds to S58.

The storage system 4 searches for the V-VOL 88 not in use among the V-VOLs 88 already created (S55). When there is the V-VOL 88 not in use among the V-VOLs 88 already created (S55:YES), the storage system 4 proceeds to S59. On the other hand, when there is no free V-VOL 88 (S55: NO), the storage system 4 judges whether the V-VOL 88 should be additionally created (S56).

When the V-VOL 88 is additionally created (S56:YES), the storage system 4 proceeds to S58. On the other hand, when the V-VOL 88 is not additionally created (S56: NO), the storage system 4 waits for the free V-VOL 88 (S57). In order to periodically check whether there is the free V-VOL 88, the storage system 4 executes processing for returning to S55 and loops steps S55 to S57 when predetermined time elapses.

When the V-VOL 88 is created, the storage system 4 starts the V-VOL creation program 54 (S58). Details of the program are described later.

After the V-VOL 88 is created, the storage system 4 maps journal data as a backup target to the V-VOL 88 (S59) and updates the V-VOL mapping table 62. The storage system 4 notifies the host computer 2 of a V-VOL number to which the journal data to be backed up is mapped (S60). The host computer 2 notifies the backup server 5 of the received V-VOL number and transmits a backup instruction to the backup server 5 (S61).

The backup server 5 issues a read request for the V-VOL 88 corresponding to the received V-VOL number to the storage system 4. The backup server 5 accesses an LUN, a V-VOL number of which is the device # of the logical unit information table 59 (S62). The storage system 4 reads out data from the V-VOL 88 (the JNL-VOL 82) and transfers the data to the backup server 5 (S63). The backup server 5 transfers the data read from the storage system 4 to the tape device 6 (S64). The tape device 6 stores the received data (S65).

Journal data is stored in the tape device 6 in V-VOL 88 units. Header information added when the V-VOL 88 is created is also stored. The tape device 6 may write, at timing of storage in the tape device 6, information such as a generation number, storage time, a journal group number (a group identifier for simultaneously changing generations of plural JNL-VOLs 82), the order, and the like of the journal data. These kinds of information may be stored by both the tape device 6 and the management server 3.

The backup server 5 reports the end of the backup to the management server 3 at a point when the data transfer to the tape device 6 is finished (S66). The management server 3 creates the catalog management information 73 concerning the carried-out backup information and manages the catalog management information 73 (S67).

The processing shown in FIG. 16 is processing in a configuration in which the management server 3 performs catalog management and stores the catalog management information 73. In the present invention, the processing can be performed in the same manner even when the storage system 4 stores the catalog management information 73 (FIG. 17) and when the backup server 5 stores the catalog management information 73 (FIG. 18).

Figure 17:
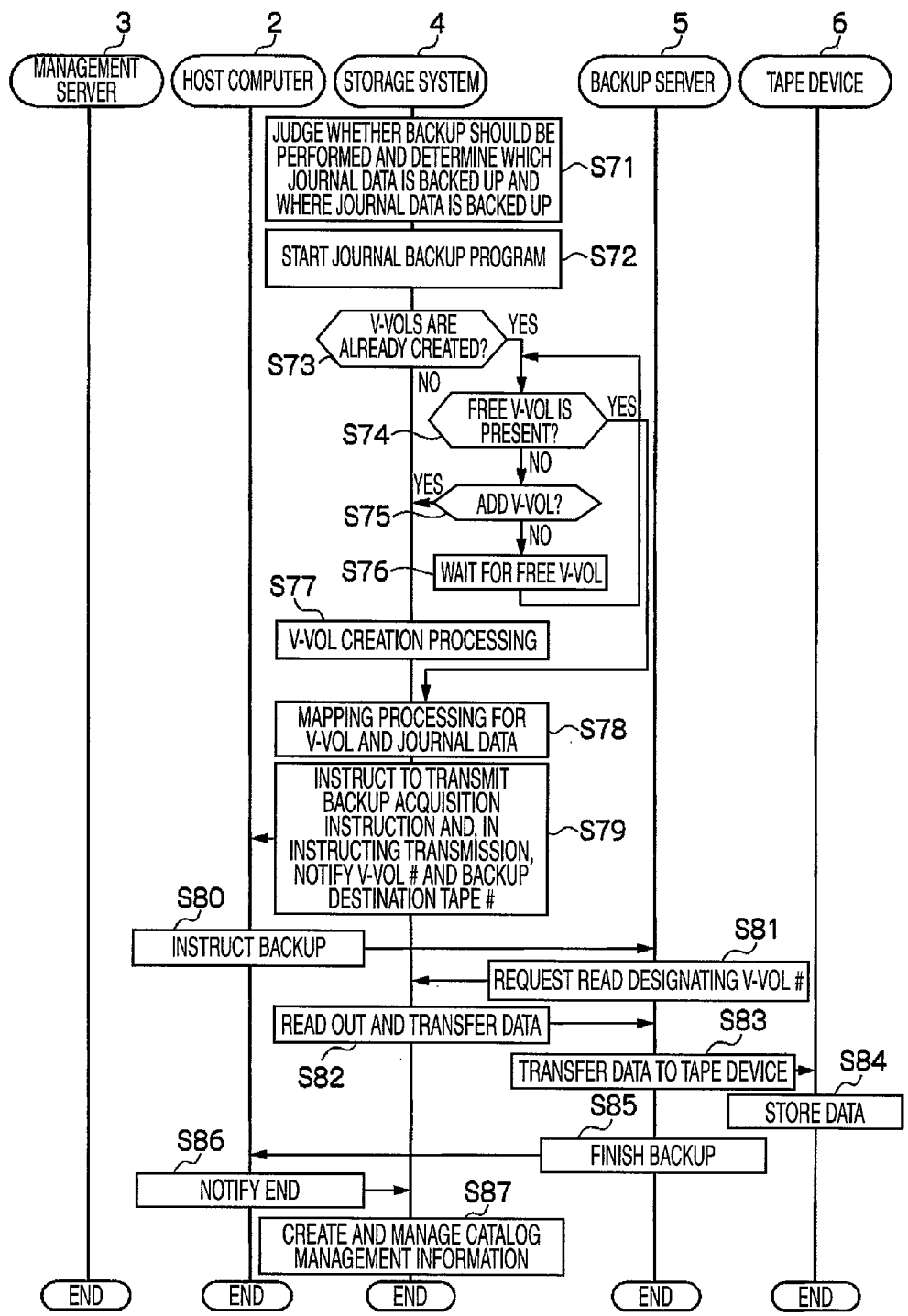
FIG. 17 is a flowchart of the journal data backup processing.
Figure 18:
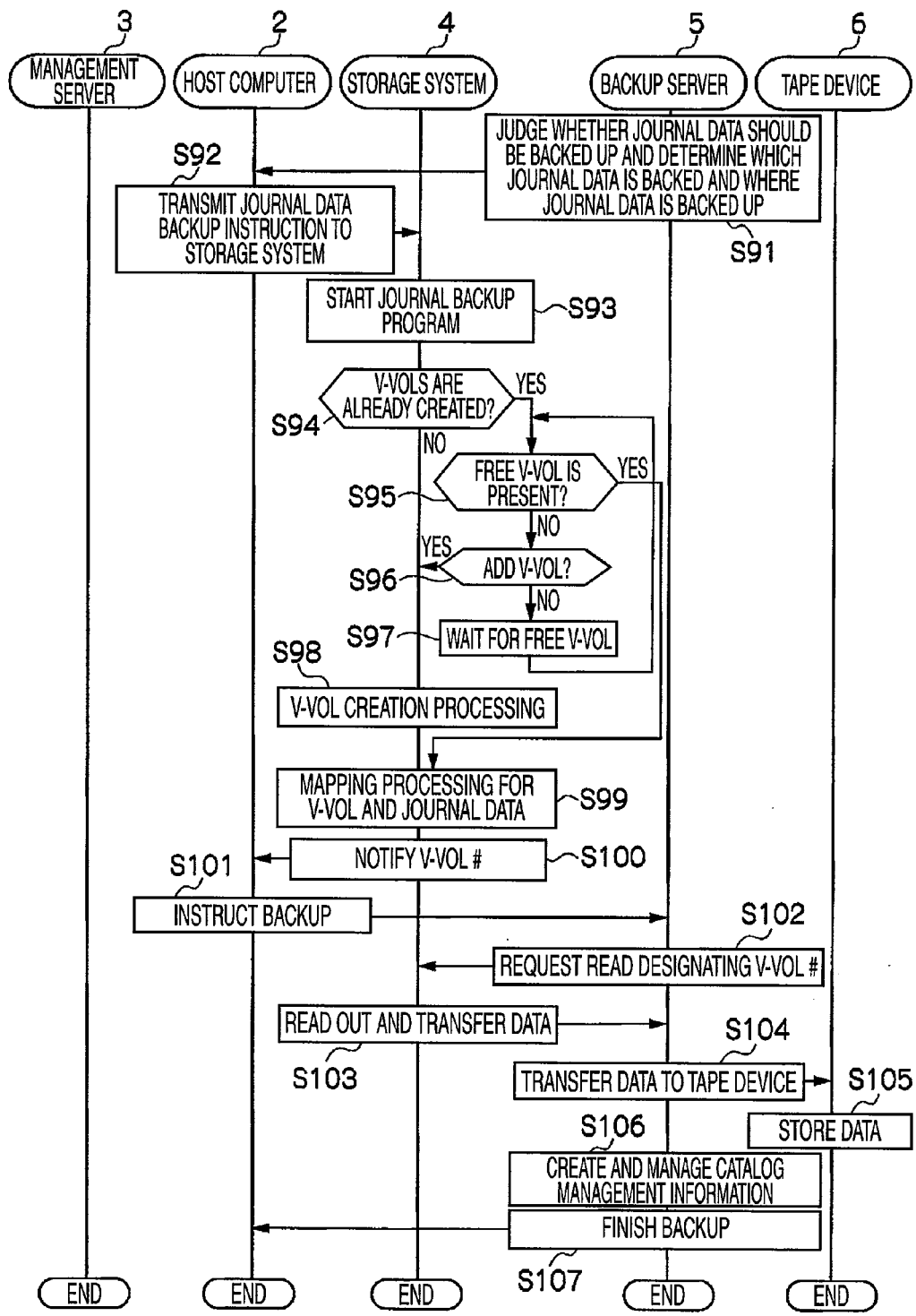
FIG. 18 is a flowchart of the journal data backup processing.

FIG. 17 is a flowchart of the journal data backup processing performed when the storage system 4 stores the catalog management information 73.

First, the storage system 4 monitors a journal data amount in the storage system 4 itself and judges whether backup for the P-VOL 81 should be performed (S71). An opportunity for the judgment may be every unit time determined in advance or may be the time when the journal data amount increases. A criterion for the judgment may be whether the journal data amount exceeds a threshold amount determined in advance or may be a ratio of the journal data amount to a total capacity available for data storage. When it is judged that the backup for the P-VOL 81 is performed, the storage system 4 determines which journal data is backed up and where the journal data is backed up (S71).

Steps S72 to S78 are the same as steps S53 to S59.

Subsequently, the storage system 4 causes the host computer 2 to transmit a backup instruction (an instruction for movement of the journal data to the tape device 6). The host computer 2 transmits a V-VOL number to which the journal data as a backup target is allocated and a number of the tape device 6 that backs up the journal data (S80).

Steps S81 to S84 are the same as steps S62 to S65.

The backup server 5 reports the end of the backup to the host computer 2 at a point when the data transfer to the tape device 6 is finished (S85). The host computer 2 notifies the storage system 4 of the end of the backup (S86). The host computer 2 creates the catalog management information 73 concerning the carried-out backup information and manages the catalog management information 73 (S87).

FIG. 18 is a flowchart of processing performed when the backup server 5 stores the catalog management information 73.

First, the backup server 5 monitors a journal data amount and judges whether backup for the P-VOL 81 should be performed. A method of the judgment may be the same as the method adopted when the storage system 4 manages the catalog management information 73. Since the backup server 5 stores the catalog management information 73, the backup server 5 may judge, from the catalog management information 73, whether the P-VOL 81 should be updated. The management server 3 and the storage system 4 may periodically transmit the journal data amount and the backup server 5 may judge, according to the transmitted journal data amount, whether backup for the P-VOL 81 should be performed. When it is judged that the backup for the P-VOL 81 is performed, the backup server 5 determines which journal data is backed up and where the journal data is backed up (S91).

Steps S92 to S105 are the same as steps S52 to S65.

Subsequently, the backup server 5 updates the catalog management information 73 (S106) and notifies the host computer 2 of the end of the backup (S107).

Figure 19:
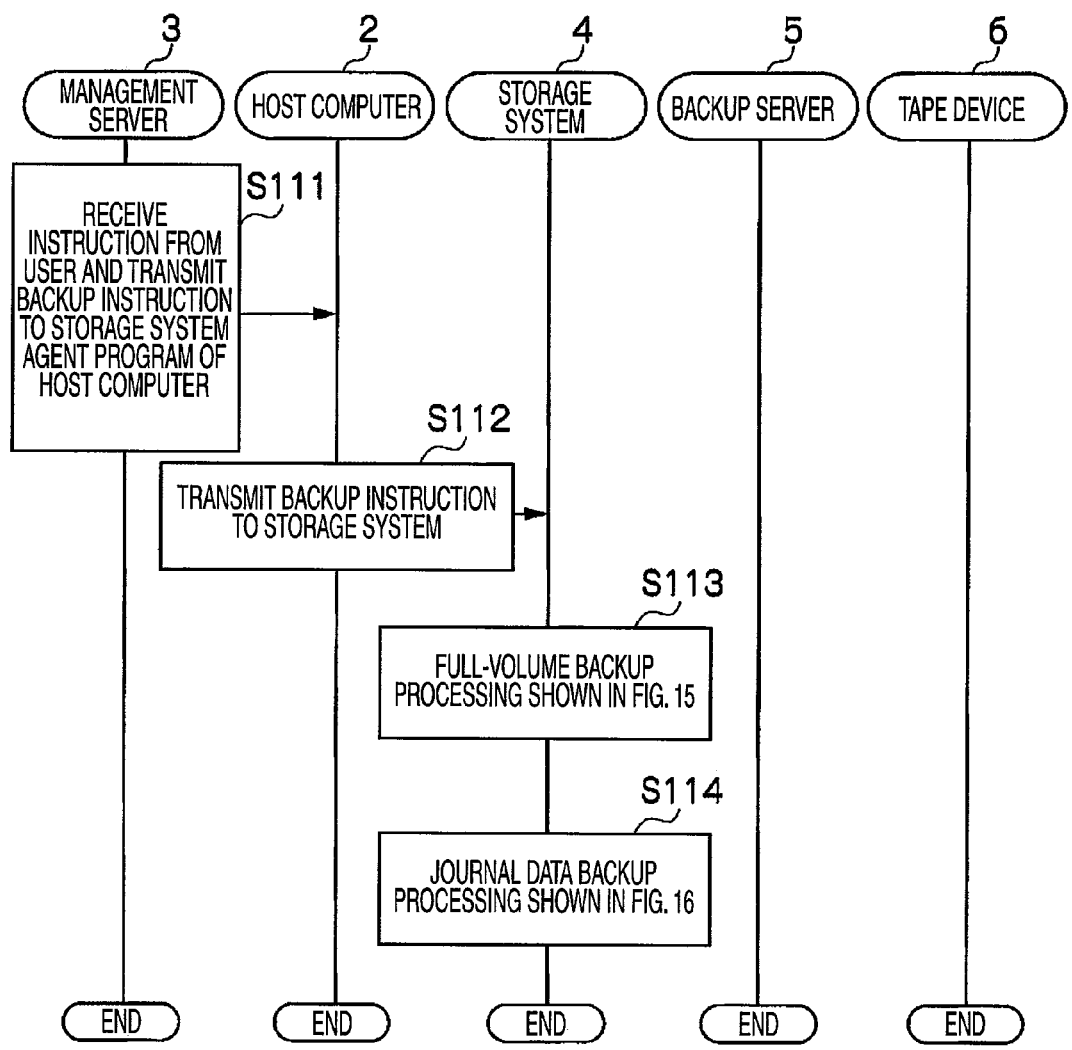
FIG. 19 is a flowchart of backup processing in a designated generation.

FIG. 19 is a flowchart of processing for backing up designated time or a generation at an arbitrary point.

When time or a generation of data to be backed up is inputted from the user, the management server 3 transmits a backup instruction to the storage system agent program of the host computer 2 (S111). Subsequently, the host computer 2 transmits a full-volume backup instruction to the storage system 4 (S112).

Subsequently, the storage system 4 performs the full-volume backup processing shown in FIG. 15. The storage system 4 acquires a snapshot of the P-VOL 81 presently used for a job. The backup server 5 reads out data of a volume of the snapshot and transfers the data to the tape device 6.

The storage system 4 performs the journal data backup processing shown in FIG. 16 in order to acquire journal data of a generation to be backed up. The storage system 4 creates the V-VOLs 88 and maps an address of the journal data storage area 83 of a generation desired to be backed up to the V-VOLs 88. The backup server 5 reads out data from the journal data storage area 83 and transfers the data to the tape device 6.

As described above, the computer system 1 performs the backup operation and performs the backup of journal data.

Figure 20:
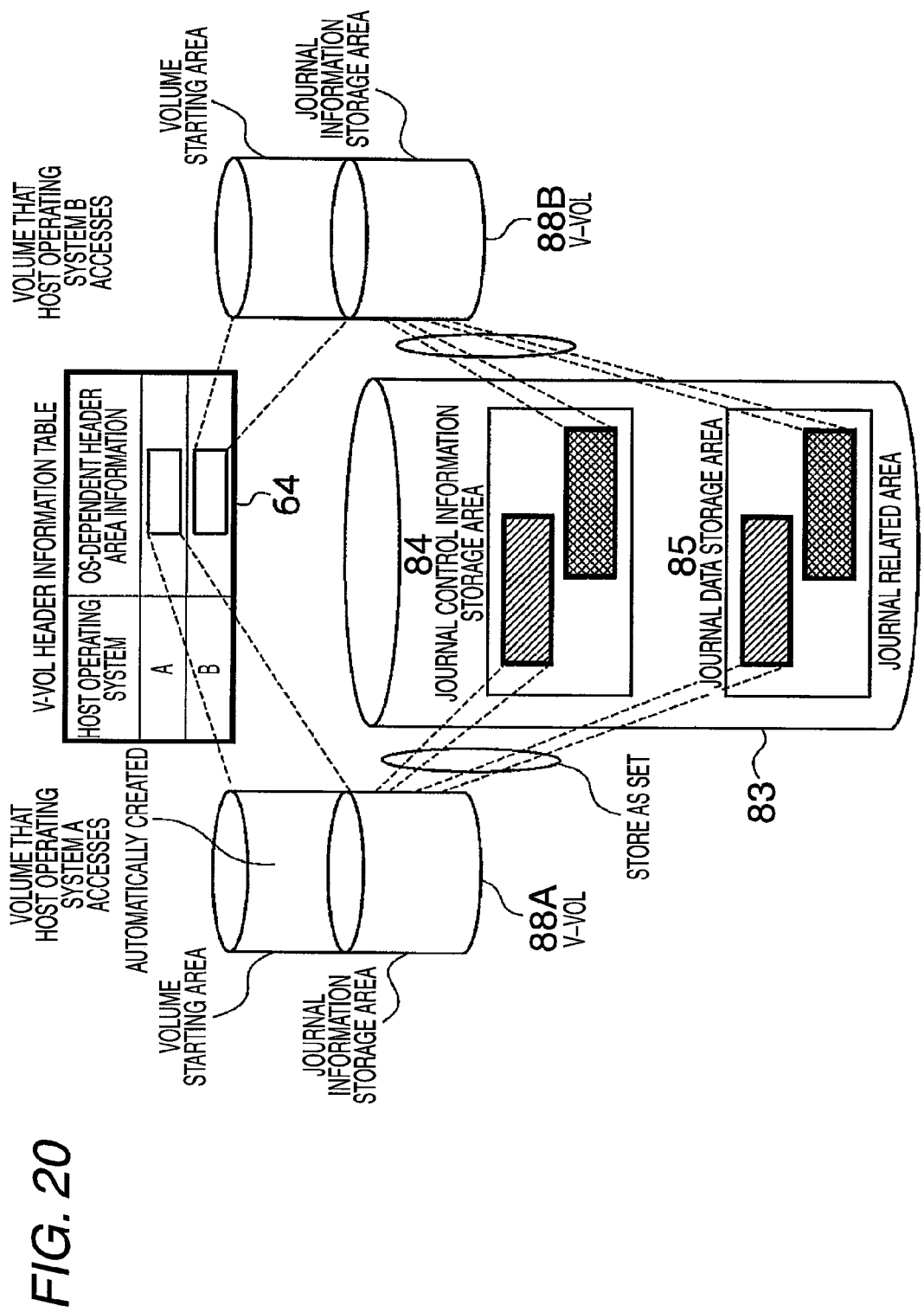
FIG. 20 is a diagram of V-VOLs.

FIG. 20 is a diagram of a configuration of the V-VOLs 88 and an image of mapping to the V-VOLs 88. Header information at volume tops of the V-VOLs 88 is stored in a storage area of the V-VOL header information table 64. The V-VOL creation program 54 links header area information of the V-VOLs 88 for the operating system of the backup server 5 to access the V-VOLs 88. When the backup server 5 receives an access request to the V-VOLs 88, the backup server 5 allows the storage system 4 side to automatically map header area information of the operating system corresponding to volume starting areas of the V-VOLs 88 and execute access to the V-VOLs 88.

Journal control information and journal data of generations requested to be backed up are mapped to the portions of journal information storage areas of the V-VOLs 88. However, a data target is stored in the journal data storage area 85. Therefore, the storage system 4 searches for, during an access, an address registered in the V-VOL mapping table 62, reads out journal data corresponding to the address, and transfers the journal data to the backup server 5.

The V-VOLs 88 are mapped in association with each of generations requested to be backed up.

The storage system 4 may create the V-VOLs 88 at an opportunity of an instruction of backup or may create the V-VOLs 88 in advance. The storage system 4 maps the journal control information and the journal data to the portions of the journal information storage areas of the V-VOLs 88. When a backup instruction is received, the storage system 4 can map plural generations with one V-VOL 88 by mounting generations corresponding to the backup instruction. Therefore, the storage system 4 manages the V-VOL 88 such that the V-VOL 88 is usually in an inaccessible state and can be accessed when a P-VOL #, a backup acquisition generation #, and a generation differential data storage starting address of a backup source are mapped to the V-VOL mapping table 62.

In this embodiment, the instruction for backup is indicated by the processing inputted from the management server 3. However, in a configuration in which the management server 3 is not present, the user may input a backup request to the backup server 5 and start the backup processing (the backup processing is the same). In that case, the user designates a backup generation or time desired to be acquired.

One V-VOL 88 changes a mode of the host computer 2 to thereby change mapping of the V-VOL 88 and OS-dependent header area information and allow the V-VOL 88 to cope with various operating systems. For example, the V-VOL 88 can be the V-VOL 88 that is accessed from an operating system "A" in some case and can be the V-VOL 88 that is accessed from an operating system "B" in another case.

In this way, since the journal data as the differential information and the data of the update portion is data independently created in the storage system 4, the backup server 5 usually does not recognize the journal data. Therefore, in the computer system 1, a function for allowing the backup server 5 to recognize and read out the journal data is provided in the storage system 4. Hierarchical management for shifting journal data in an old generation with a low frequency of use to a low-cost storage device on the outside is performed to back up a logical volume designated by the user.

(5) Restore Processing

Figure 21:
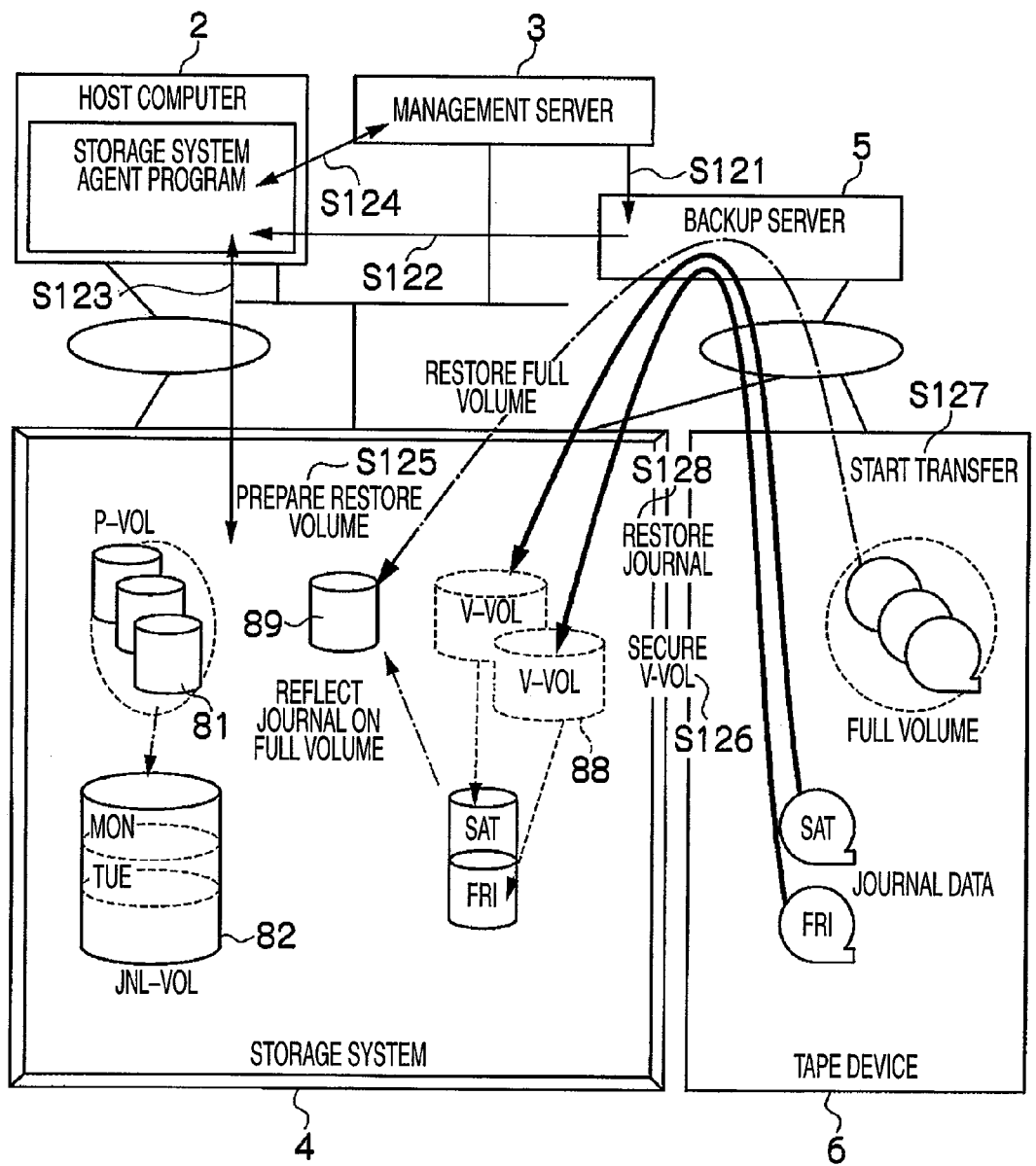
FIG. 21 is a diagram of restore processing.

FIG. 21 is a diagram of an overview of the restore processing.

First, when a restore instruction is transmitted from the management server 3 (S121), the backup server 5 transmits a restore request to the host computer 2. Subsequently, the host computer 2 halts an application and transmits the restore instruction to the storage system 4 (S123). The management server 3 recognizes, for example, where the V-VOL 88 used by the application of the host computer 2 is present (S124).

When the restore instruction is received from the host computer 2, the storage system 4 secures a volume for restore (a restore volume) 89 (S125). The storage system 4 secures the V-VOL 88 for journal data restore and the journal data storage area 85 (S126).

When it is informed that the storage system 4 is ready, the backup server 5 starts transfer of data of a full volume and journal data of the tape device 6 to the storage system 4 (S127). The storage system 4 restores a logical volume of a generation designated by the user from the received data of the full volume and Journal data (S128).

Figure 22:
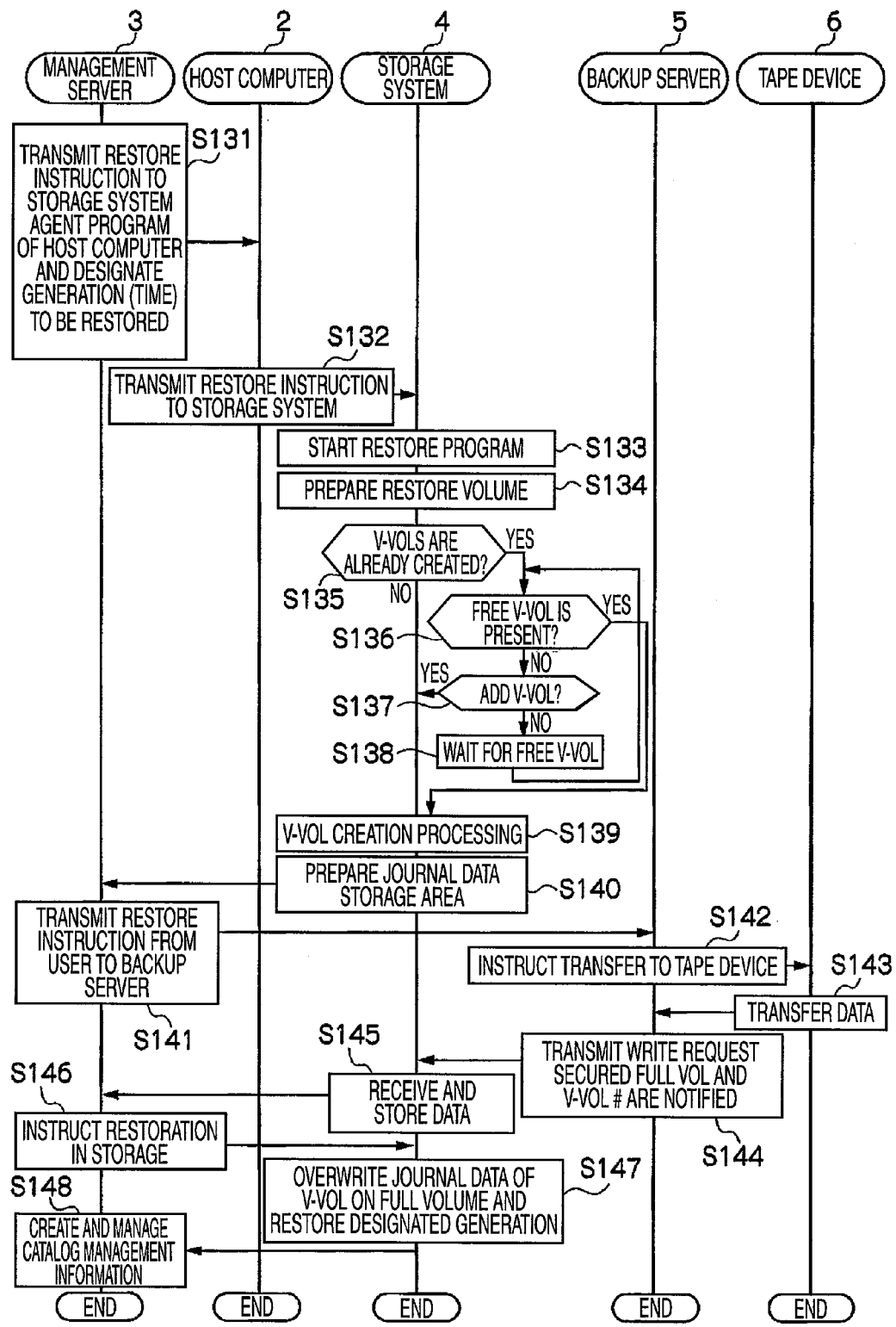
FIG. 22 is a flowchart of journal restore processing.

FIG. 22 is a flowchart of the restore processing for restoring journal data.

First, when a restore instruction from the user and a generation number to be restored or time for restore are inputted, the management server 3 transmits the restore instruction to the storage system agent program of the host computer 2 (S131). Subsequently, the host computer 2 transmits the restore instruction to the storage system 4 (S132). The storage system 4 starts the journal restore program 56 (S133).

Subsequently, the storage system 4 secures, from free volumes, the restore volume 89 for restoring a logical volume backed up from the tape device 6 by the full-volume backup processing (S134). The storage system 4 searches whether the V-VOLs 88 for restoring journal data are already created (S135). When the V-VOLs 88 are already created (S135: YES), the storage system 4 proceeds to S139. On the other hand, when the V-VOLs 88 are not created (S135: NO), the storage system 4 proceeds to S136.

The storage system 4 searches for the V-VOL 88 not in use among the V-VOLs 88 already created (S136). When there is the V-VOL 88 not in use among the V-VOLs 88 already created (S136: YES), the storage system 4 proceeds to S139. On the other hand, when there is no free V-VOL 88 (S136: NO), the storage system 4 judges whether the V-VOL 88 should be additionally created (S137).

When the V-VOL 88 is additionally created (S137: YES), the storage system 4 proceeds to S139. On the other hand, when the V-VOL 88 is not additionally created (S137: NO), the storage system 4 waits for the free V-VOL 88 (S138). In order to periodically check whether there is the free V-VOL 88, the storage system 4 executes processing for returning to S136 and loops steps S136 to S138 when predetermined time elapses.

When the V-VOL 88 is created, the storage system 4 starts the V-VOL creation program 54 (S139).

After the V-VOL 88 is created, the storage system 4 prepares the journal data storage area 85 for storing journal data to be restored and maps the journal data storing area 85 and updates the V-VOL mapping table 62 (S140). When a report to the effect that restore preparation is completed is received from the storage system 4, the management server 3 checks in which tape device 6 a restore instruction request from the user is stored and transmits a restore instruction to the backup server 5 (S141). The backup server 5 transmits a transfer instruction to the tape device 6 at a restore source (S142).

The tape device 6 transfers target data to the backup server 5 (S143). The backup server 5 transmits a write request to the storage system 4 in order to store data read from the tape device 6 in the storage system 4 (S144). At this point, the backup server 5 is notified of a secured write destination from the storage system 4 (may be notified through the host computer 2).

The storage system 4 receives data transmitted to the storage system 4 itself and stores the data in the secured place (S145). At this point, the storage system 4 stores, together with the write data, information (a generation, acquisition time, and the like of a journal) added when the journal data is written in the tape device 6 in the control memory 37 in the storage system 4. When the reception of the write data is finished, the storage system 4 transmits an end report to the management server 3.

The management server 3 transmits a restoration instruction for the restore volume 89 to the storage system 4 (S146). The storage system 4 recognizes, from the information stored in S145 and the catalog management information 73 managed by the management server 3, journal data of which full volume (the restore volume 89) the restored journal data is (to which full volume the journal data should be updated). The storage system 4 overwrites the restored data of the V-VOL 88 on the full volume (the restore volume 89), reflects the journal data on the restore volume 89, and restores the restore volume 89 to content of a generation, restoration of which is instructed by the user (S147). The management server 3 creates the catalog management information 73 concerning the carried-out restore information and manages the catalog management information 73 (S148).

In this way, in the computer system 1, the journal data shifted to the outside of the storage system 4 is shifted to the storage system 4 again to restore a logical volume designated by the user.

(6) Merge of Differences

As explained with reference to FIGS. 23 and 24 later, the inter-generation differential data 87 and the differential BMs 86 for plural generations can be merged. Consequently, in the computer system 1, a consumed storage capacity can be reduced. In the following explanation, the inter-generation differential data 87 after the merge is referred to as "merge differential data".

Figure 23:
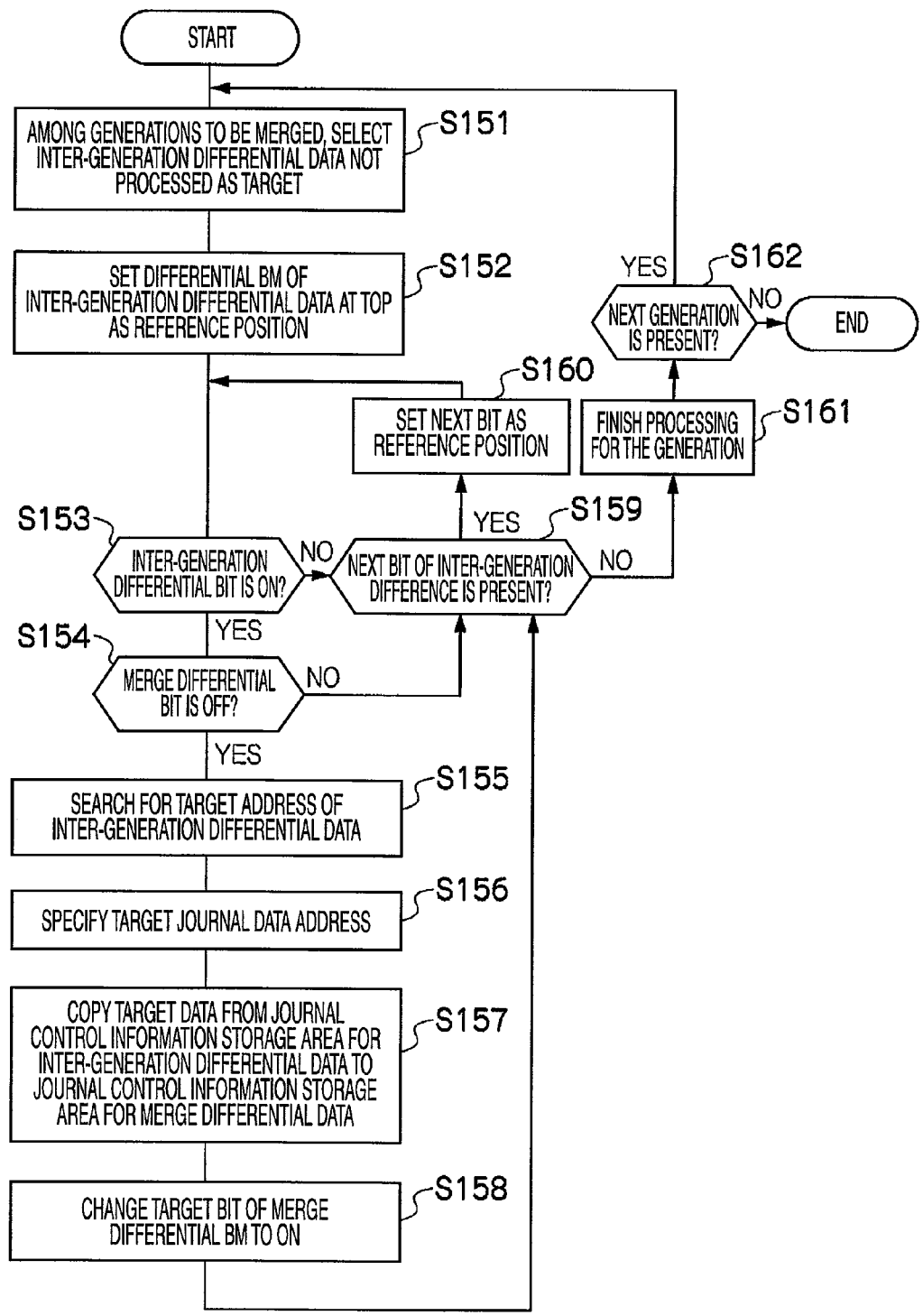
FIG. 23 is a flowchart of merge processing.
Figure 24:
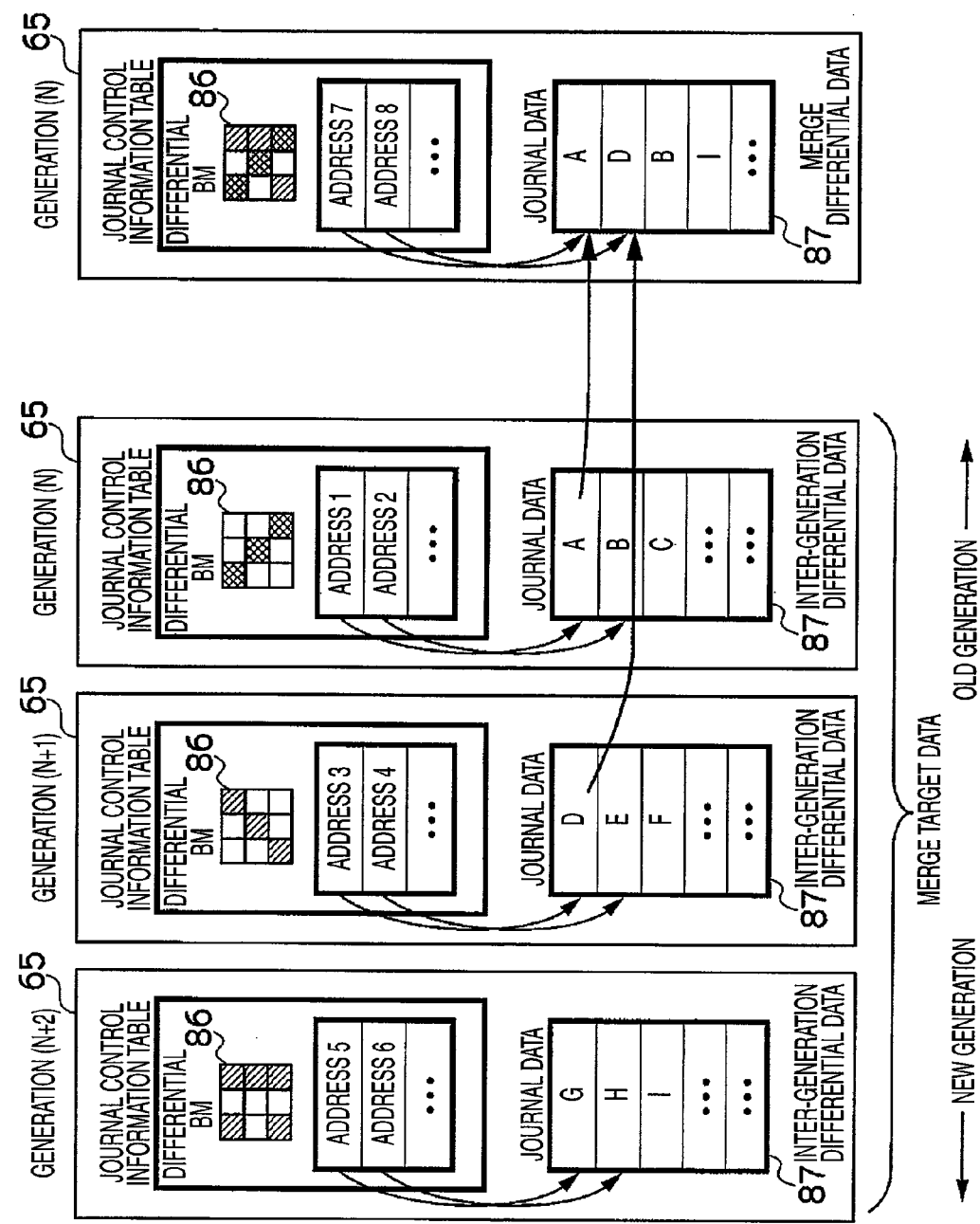
FIG. 24 is a diagram of the merge processing.

FIG. 23 is a flowchart of processing for merging the inter-generation differential data 87. FIG. 24 is a diagram of movement of data elements related to the merge processing. The merge processing is explained below with reference to FIGS. 23 and 24.

When it is detected that the inter-generation differential data 87 for a certain number of generations (e.g., (m+1) generations (a generation (N) to a generation (N+m)) is stored, the journal merge program 57 (see FIG. 2) starts merge processing for converting inter-generation differential data for (m+1) generations into the merge differential data 87 (described later). As an opportunity for starting the merge processing, the detection of the storage of the inter-generation differential data 87 for (m+1) generations is only an example. The merge processing may be started at other opportunities, for example, when a predetermined period elapses from the immediately preceding merge processing.

First, the journal merge program 57 changes a "state" (not shown) of the generation (N) to the generation (N+m) as a merge target to "being merged" in the journal information table 61. The journal merge program 57 selects the inter-generation differential data 87 of the oldest generation (N) in the merge target as a target (S151).

Subsequently, the journal merge program 57 determines a starting bit of the differential BM 86 (N) corresponding to the target inter-generation differential data 87 as a reference position (S152).

The journal merge program 57 searches for a bit set as the reference position for the differential BM 86(N) (S153). When the bit is ON (S153: YES), the journal merge program 57 proceeds to S154. When the bit is OFF (S153: NO), the journal merge program 57 proceeds to S159. In the explanation of FIGS. 23 and 24 below, the bit set as the reference position is referred to as "target bit". When the bit is ON, the bit is referred to as "target ON bit". When the bit is OFF, the bit is referred to as "target OFF bit".

Concerning the differential BM 86 corresponding to the merge differential data 87 created this time (referred to as "merge differential BM" in the explanation of the FIGS. 23 and 24 below), the journal merge program 57 searches for a bit in the same position as the target bit (S154). When the target bit is OFF (S154: YES), the journal merge program 57 proceeds to S155. When the target bit is ON (S154: ON), the journal merge program 57 proceeds to S159.

The journal merge program 57 searches for a data storage address of the journal data storage area 85 of the inter-generation differential data 87 corresponding to the target ON bit in the differential BM 86 (N) (S155) and specifies the address (S156). The journal merge program 57 copies (overwrites) the inter-generation differential data 87 stored in a segment indicated by the address from the segment to (on) a segment in the journal data storage area 85 corresponding to the merge differential data 87 created this time (the next segment of an immediately preceding segment at a copy destination) (S157). The journal merge program 57 changes a bit in the same position as the target bit in the merge differential BM 86 to ON (S158).

The journal merge program 57 searches for a bit not referred to yet in a position next to the reference position in the differential BM 86 (N) (S154). When the bit is present (S159: YES), the journal merge program 57 changes the next bit as a reference position (S160) and proceeds to S153. On the other hand, when the bit not referred to yet is not present in the next position (S159: NO), the journal merge program 57 finishes the processing for the generation (N) (S161) and searches whether the next generation is present (S162). When the next generation is present (S162: YES), the journal merge program 57 proceeds to S151 and selects the inter-generation differential data 87 of the next generation (N+1) as a target. On the other hand, when the next generation is not present (i.e., the immediately preceding processed generation is (N+m)) (S162: NO), the journal merge program 57 finishes the merge processing.

According to the flow described above, as shown in FIG. 24, the storage system 4 processes the inter-generation differential data 87 corresponding to an old generation among the generations (N) to (N+m) of the merge target earlier. When a bit is an ON bit in the differential BM 86 corresponding to the inter-generation differential data 87 and a bit corresponding to the ON bit is OFF in the merge differential BM 86, the storage system 4 copies the inter-generation differential data 87 corresponding to the ON bit to the journal data storage area 85 corresponding to the merge differential data 87. On the other hand, when a bit is an ON bit in the differential BM 86 corresponding to the inter-generation differential data 87 and a bit corresponding to the ON bit is also ON in the merge differential BM 86, the storage system 4 does not copy a data element corresponding to the ON bit in the differential BM 86 corresponding to the inter-generation differential data 87.

In short, the storage system 4 more preferentially copies the inter-generation differential data 87 corresponding to an older generation to the journal data storage area 85 corresponding to the merge differential data 87. Specifically, for example, as shown in FIG. 24, concerning two generations, the generation (N) and the generation (N+m), elements "A" and "G" of the inter-generation differential data 87 corresponding to a starting block of the P-VOL 81 are present. In this case, as described above, an inter-generation differential data element corresponding to an older generation is given higher priority. Therefore, the storage system 4 copies the element "A" for the generation (N) to the journal data storage area 85 corresponding to the merge differential data 87 but does not copy the element "G" for the generation newer than the generation (N) to the journal data storage area 85.

In this merge processing, an old generation is processed earlier. However, a new generation may be processed earlier. In this case, when a bit is an ON bit in the differential BM 86 corresponding to inter-generation differential data and a bit corresponding to the ON bit is also ON in the merge differential BM 86, the storage system 4 may overwrite data corresponding to the ON bit in the differential BM 86 corresponding to the inter-generation differential data 87 on the merge differential data 87 corresponding to the ON bit stored in the journal data storage area 85 corresponding to the merge differential data 87. When the merge differential data 87 is created, the storage system 4 may delete the inter-generation differential data 87 for plural generations, which are the basis of the merge differential data 87, immediately after the completion of the creation of the merge differential data 87 or in response to an instruction from a computer (e.g., the host computer 2 or the management server 3).

The storage system 4 may delete the inter-generation differential data 87 and the merge differential data 87 from an old generation. In this case, the storage system 4 opens, for example, according to a not-shown journal deletion program, the journal control information table 64 and journal data corresponding to a generation to be deleted and manages an opened area as a free area. The journal deletion program deletes an entry corresponding to the generation from the P-VOL configuration information table 60 and the journal information table 61.

As described above, the storage system 4 can merge differences and, then, back up data in the tape device 6.

In this way, in the computer system 1, the storage system 4 provides the function for allowing the backup server 5 to recognize journal data.

In other words, the storage system 4 generates a virtual volume (the V-VOL 8) corresponding to a volume of the journal data. Subsequently, in order to cause the backup server 5 to recognize the V-VOL 88, the storage system 4 sets header information original to the V-VOL 88 at the top of the V-VOL 88. The header information is different depending on a type of the operating system of the backup server 5.

The storage system 4 associates the journal data with the generated V-VOL 88. Specifically, the user designates a generation (or time) to be backed up and the storage system 4 searches for a position where journal data corresponding to the generation is stored and maps the position to the V-VOL 88. The backup server 5 reads out the journal data from the V-VOL 88 of the storage system 4, stores the read-out journal data in the tape device 6, and backs up the journal data.

In the computer system 1, the storage system 4 provides the function of restoring the backed-up journal data. The storage system 4 returns, according to a restore instruction from the management server 3, the journal data stored in the tape device 6 into the storage system 4 using the V-VOL 88 and restores a logical volume based on the restore instruction.

Therefore, the backup server 5 can directly read out the journal data itself and store the journal data in the tape device 6. The backup server 5 can transmit the journal data stored in the tape device 6 to the storage system 4. The storage system 4 can access the journal data itself.

Consequently, in the computer system 1, since the technique for the backup server 5 to read out the journal data from the storage system 4 is generalized, it is possible to back up the journal data itself in a peripheral device (the tape device 6, etc.) on the outside of the storage system 4.

In this embodiment, the JNL-VOL 82 in which journal data is stored as a volume that the backup server 5 cannot recognize is described. However, the present invention is not limited to this. The present invention can be applied to information of an original format in the storage system 4 except the JNL-VOL 82 in which the journal data is stored. Examples of the information of the original format include differential data of a snapshot and stored data of a volume that dynamically expands a storage area (thin provisioning). It is necessary to generate a storage pool in the storage system 4 and write these data in the storage pool. Therefore, the data are the information of the original format in the storage system 4 and cannot be recognized from an external storage device such as the backup server 5.

In this embodiment, as a method of selecting journal data to be moved, it is also possible to select a method of moving the journal data in order from one with a lowest frequency of use (access frequency), moving the journal data in order from one with earliest creation time, and moving the journal data form one designated by the user.

Moreover, in this embodiment, as an opportunity for moving the journal data, the journal data may be moved when a total volume of the PDEV 39 in use in the storage system 4 increases to be larger than a preset value when journal data with an access frequency lower than a frequency set in advance is generated, or when the user designate the movement of the journal data.

The present invention can be widely applied to storage devices that carry out backup of logical volumes in which data is stored.

What is claimed is:

1. A storage system that is coupled to a first computer and a second computer and backs up data in a storage device coupled to the second computer, the storage system comprising:
   a first logical volume in which write data is written in accordance with a write request received from the first computer;
   a second logical volume that stores journal data of the first logical volume, the journal data being delimited at predetermined points in time, the second computer being unable to read the journal data from the second logical volume;
   a third volume which is a virtual volume;
   a virtual-volume creating unit that creates the third volume which the second computer is able to access to read at least the journal data in order to back up the first logical volume at a predetermined point in time;
   a mapping unit that maps an address where the journal data is stored in the second logical volume to the third volume that is created by the virtual-volume creating unit; and
   a backup unit that reads the journal data from the second logical volume according to the address mapped to the third volume in accordance with a read request with respect to the third volume from the second computer, and transfers the journal data to the second computer in order to store the journal data in the storage device.

2. The storage system according to claim 1, wherein the virtual-volume creating unit creates the third volume according to a type of an operating system of the second computer.

3. The storage system according to claim 1, wherein the storage system is further coupled to a third computer that manages a storage device number of the storage device storing the journal data which was read from the second logical volume.

4. The storage system according to claim 1, further comprising:

a memory retaining management information for managing a storage device number of the storage device storing the journal data of the second logical volume.

5. The storage system according to claim 1, wherein management information, for managing the storage device number of the storage device storing the journal data of the second logical volume, is retained by the second computer.

6. A storage system that is coupled to a first computer and a second computer and backs up data in a storage device coupled to the second computer, comprising:
   a first logical volume in which write data is written in accordance with a write request received from the first computer;
   a second logical volume that stores journal data of the first logical volume, the journal data being delimited at predetermined points in time, the second computer being unable to read the journal data from and write the write data in the second logical volume;
   one or more third volumes which are virtual volumes;
   a mapping unit that maps an address where the journal data is stored in the second logical volume to the one or more third volumes; and
   a backup unit that reads the journal data from the second logical volume according to the address mapped to one of the one or more third volumes in accordance with a read request with respect to the one of the one or more third volumes from the second computer, and transfers the journal data to the second computer in order to store the journal data in the storage device.

7. The storage system according to claim 6, wherein the mapping unit, when it receives from the second computer a read request with respect to the one of the one or more third volumes, maps header area information that corresponds to a type of an operating system of the second computer to one of the third volumes.

8. The storage system according to claim 6, wherein the mapping unit maps header area information that corresponds to types of multiple operating systems to the one or more third volumes.

9. The storage system according to claim 8, wherein the mapping unit changes the header area information mapped to one of the one or more third volumes to another header area information, the another header area information corresponding to the type of another operating system.

10. The storage system according to claim 8, wherein the mapping unit maps the address where the journal data is stored in the second logical volume, to a third volume, to which the header area information that corresponds to the same type as the type of an operating system of the second computer is mapped, among the one or more third volumes in which the header area information that corresponds to the types of multiple operating systems has been mapped.

11. A backup method for a storage system that is coupled to a first computer and a second computer and backs up data in a storage device coupled to the second computer, wherein the storage system includes:
   a first logical volume in which write data is written in accordance with a write request received from the first computer, and
   a second logical volume that stores journal data of the first logical volume, the journal data being delimited at predetermined points in time, and the second computer being unable to read the journal data from the second logical volume,
   the backup method comprising:
   determining whether there is a virtual volume which the second computer is able to access to read at least the journal data in order to back up the first logical volume at a predetermined point in time;
   creating the virtual volume if it is determined that there is no virtual volume;
   mapping an address where the journal data is stored in the second logical volume to the virtual volume if it is determined that there is the virtual volume or if the virtual volume is created;
   reading, in accordance with a read request with respect to the virtual volume from the second computer, the journal data according to the address mapped to the virtual volume; and
   transferring the read journal data to the second computer in order to store the journal data in the storage device.

12. The backup method according to claim 11, wherein when a backup instruction is received from the first computer, the step of determining whether there is the virtual volume or not is executed.

13. The backup method according to claim 11, wherein whether the first logical volume needs to be backed up or not is determined, and if it is determined that the first logical volume needs to be backed up, the step to determine whether there is the virtual volume or not is executed.

14. The backup method according to claim 11, wherein if it is determined that there is the virtual volume, whether the virtual volume is already in use is determined,
   wherein if the virtual volume is already in use, another virtual volume is created,
   wherein the address where the journal data is stored in the second logical volume is mapped to the another created virtual volume, and
   wherein if the virtual volume is not in use, the address where the journal data is stored in the second logical volume is mapped to the virtual volume.

15. The backup method according to claim 14, wherein, if the virtual volume is already in use, whether to create the other virtual volume or to wait until the virtual volume becomes available is determined.

16. The backup method according to claim 11, wherein the second computer is notified, via the first computer, of identification information concerning the virtual volume to which the address where the journal data is stored in the second logical volume is mapped, and
   wherein the read request including the identification information is received from the second computer.

17. The backup method according to claim 11, wherein, after the journal data is transferred to the second computer, management information for managing a storage device number of the storage device in which the journal data is stored, is created and retained.

18. The backup method according to claim 11, wherein, when the read request is received from the second computer, header area information that corresponds to the type of an operating system of the second computer is mapped to the virtual volume.

19. The backup method according to claim 11, wherein header area information that corresponds to the type of an operating system of the second computer is mapped to the virtual volume, and
   wherein the header area information mapped to the virtual volume is changed, at an arbitrary point in time, to another header area information that corresponds to the type of another operating system.

* * * * *